(12) United States Patent
Seibert et al.

(10) Patent No.: US 9,643,127 B2
(45) Date of Patent: *May 9, 2017

(54) SIMULTANEOUS REMOVAL OF OIL AND GASES FROM LIQUID SOURCES USING A HOLLOW FIBER MEMBRANE

(71) Applicants: Board of Regents, The University of Texas System, Austin, TX (US); Organic Fuels Algae Technologies, LLC, Houston, TX (US)

(72) Inventors: Frank Seibert, Austin, TX (US); Stephen William Briggs, Austin, TX (US); Stacy S. Truscott, Austin, TX (US); Peter B. Kipp, Houston, TX (US)

(73) Assignee: Board of Regents of The University of Texas System, Austin, TX (US)

(*) Notice: Subject to any disclaimer, the term of this patent is extended or adjusted under 35 U.S.C. 154(b) by 364 days.

This patent is subject to a terminal disclaimer.

(21) Appl. No.: 14/100,186

(22) Filed: Dec. 9, 2013

(65) Prior Publication Data
US 2014/0131279 A1    May 15, 2014

Related U.S. Application Data

(63) Continuation-in-part of application No. 14/052,516, filed on Oct. 11, 2013, and a continuation-in-part of
(Continued)

(51) Int. Cl.
*B01D 11/00* (2006.01)
*B01D 11/04* (2006.01)
(Continued)

(52) U.S. Cl.
CPC ........... *B01D 65/02* (2013.01); *B01D 17/085* (2013.01); *B01D 19/0031* (2013.01);
(Continued)

(58) Field of Classification Search
CPC .. B01D 2311/04; B01D 63/02; B01D 61/246; B01D 17/045; B01D 61/00;
(Continued)

(56) References Cited

U.S. PATENT DOCUMENTS 2,611,490 A    9/1952    Robinson
3,956,112 A *  5/1976   Lee .................... B01D 11/0415
                                                      210/500.23
(Continued)

FOREIGN PATENT DOCUMENTS

CA    2248280 A1    10/1998
EP    0554567 A1    8/1993
(Continued)

OTHER PUBLICATIONS

European Patent Office, Extended European Search Report for European Patent Appl. No. 11733393.0 (PCT/US2011021185) dated Sep. 16, 2015. 8 pp.
(Continued)

*Primary Examiner* — Ana Fortuna
(74) *Attorney, Agent, or Firm* — Kilpatrick Townsend & Stockton LLP

(57) ABSTRACT

The present invention includes an apparatus and method for removing oil from a oil-containing liquid comprising oil and gas comprising: a source of oil-containing liquid; and a membrane contactor system in fluid communication with the source of oil-containing liquid, the membrane contactor system comprising one or more membrane contactors having a first and a second surface, wherein the first surface coalesces oil and removes gas from the oil-containing liquid, and the oil and gas are collected on the second surface from the oil-containing liquid.

18 Claims, 15 Drawing Sheets

Related U.S. Application Data application No. 13/918,766, filed on Jun. 14, 2013, and a continuation-in-part of application No. 13/358,897, filed on Jan. 26, 2012, now Pat. No. 8,491,792, and a continuation-in-part of application No. 13/280,028, filed on Oct. 24, 2011, now Pat. No. 8,617,396, and a continuation-in-part of application No. 13/006,342, filed on Jan. 13, 2011, now Pat. No. 8,486,267.

(60) Provisional application No. 61/295,607, filed on Jan. 15, 2010, provisional application No. 61/659,918, filed on Jun. 14, 2012, provisional application No. 61/769,286, filed on Feb. 26, 2013.

(51) Int. Cl.

| | | |
|---|---|---|
| *B01D 61/00* | (2006.01) | |
| *C02F 1/26* | (2006.01) | |
| *C02F 1/44* | (2006.01) | |
| *B01D 53/22* | (2006.01) | |
| *B01D 65/02* | (2006.01) | |
| *B01D 63/02* | (2006.01) | |
| *B01D 17/00* | (2006.01) | |
| *B01D 19/00* | (2006.01) | |
| *C10G 31/06* | (2006.01) | |
| *C10G 31/09* | (2006.01) | |
| *C10G 31/10* | (2006.01) | |
| *C10G 7/02* | (2006.01) | |

(52) U.S. Cl.
CPC ............ *B01D 61/00* (2013.01); *B01D 63/02* (2013.01); *C10G 7/02* (2013.01); *C10G 31/06* (2013.01); *C10G 31/09* (2013.01); *C10G 31/10* (2013.01); *B01D 2311/04* (2013.01)

(58) Field of Classification Search
CPC .. C02F 2101/32; C02F 1/444; C02F 2303/24; C02F 2103/365
USPC ...................... 210/634, 650; 95/50
See application file for complete search history.

(56) References Cited

U.S. PATENT DOCUMENTS

| | | | |
|---|---|---|---|
| 4,309,289 A | | 1/1982 | Head |
| 4,439,629 A | | 3/1984 | Ruegg |
| 4,531,593 A | * | 7/1985 | Elliott .................. E21B 43/121 166/105 |
| 4,814,088 A | | 3/1989 | Kutowy et al. |
| 4,846,976 A | | 7/1989 | Ford |
| 4,846,978 A | * | 7/1989 | Leggett ..................... C02F 1/78 210/748.15 |
| 4,886,603 A | * | 12/1989 | Taylor .................... B01D 17/02 210/195.2 |
| 4,933,198 A | | 6/1990 | Lee et al. |
| 4,966,707 A | | 10/1990 | Cussler et al. |
| 5,069,926 A | | 12/1991 | Iwata et al. |
| 5,078,886 A | | 1/1992 | Hsu |
| 5,107,056 A | | 4/1992 | Chen et al. |
| 5,167,824 A | | 12/1992 | Cohen et al. |
| 5,209,838 A | | 5/1993 | Sleppy et al. |
| 5,236,474 A | | 8/1993 | Schofield et al. |
| 5,252,220 A | | 10/1993 | Coughlin et al. |
| 5,263,409 A | | 11/1993 | Van Eikeren et al. |
| 5,350,527 A | | 9/1994 | Kitko |
| 5,378,369 A | | 1/1995 | Rose et al. |
| 5,378,639 A | | 1/1995 | Sasaki et al. |
| 5,397,369 A | | 3/1995 | Ohishi |
| 5,639,375 A | | 6/1997 | Hiroshi |
| 5,779,889 A | | 7/1998 | Sugiura |
| 5,838,922 A | * | 11/1998 | Galand .................. H04L 47/10 370/412 |
| 5,938,922 A | | 8/1999 | Fulk, Jr. et al. |
| 5,951,875 A | | 9/1999 | Kanel et al. |
| 5,954,858 A | | 9/1999 | Peretti et al. |
| 5,989,431 A | | 11/1999 | Evans et al. |
| 6,117,327 A | | 9/2000 | Ciora et al. |
| 6,146,535 A | * | 11/2000 | Sutherland ............ B01D 17/08 210/500.23 |
| 6,187,987 B1 | | 2/2001 | Chin et al. |
| 6,228,146 B1 | * | 5/2001 | Kuespert ................ B01D 61/00 166/105.5 |
| 6,436,290 B1 | * | 8/2002 | Glassford ............ B01D 17/042 210/137 |
| 6,471,869 B1 | * | 10/2002 | Yanou .................... B01D 61/14 210/195.2 |
| 6,471,969 B1 | * | 10/2002 | Schlachter ................ A23L 1/30 424/400 |
| 6,920,637 B2 | | 7/2005 | Mason et al. |
| 7,186,344 B2 | | 3/2007 | Hughes |
| 8,092,685 B1 | | 1/2012 | Gonzalez et al. |
| 8,110,112 B2 | | 2/2012 | Alburty et al. |
| 8,128,827 B2 | | 3/2012 | Gallo et al. |
| 8,202,425 B2 | | 6/2012 | Kale |
| 8,366,794 B2 | | 2/2013 | Tremblay et al. |
| 8,455,669 B2 | | 6/2013 | Miranda et al. |
| 8,486,267 B2 | | 7/2013 | Seibert et al. |
| 8,491,792 B2 | | 7/2013 | Kipp et al. |
| 8,506,685 B2 | | 8/2013 | Taylor et al. |
| 8,523,981 B2 | | 9/2013 | Huang et al. |
| 8,617,396 B2 | | 12/2013 | Kipp et al. |
| 9,145,316 B2 | | 9/2015 | Ahmadun et al. |
| 9,149,772 B2 | * | 10/2015 | Seibert ................. B01D 17/085 |
| 2003/0185956 A1 | | 10/2003 | Gradley |
| 2004/0200769 A1 | | 10/2004 | Hunsinger |
| 2004/0222156 A1 | | 11/2004 | Yu et al. |
| 2004/0232046 A1 | * | 11/2004 | Tanaka ....................... C01B 3/34 208/107 |
| 2005/0098504 A1 | | 5/2005 | Manz et al. |
| 2005/0147757 A1 | | 7/2005 | Roh et al. |
| 2006/0191838 A1 | | 8/2006 | Lowell |
| 2006/0275533 A1 | | 12/2006 | Fletcher et al. |
| 2007/0144716 A1 | | 6/2007 | Doh et al. |
| 2008/0083671 A1 | * | 4/2008 | Bomberger .............. A61M 1/34 210/643 |
| 2008/0156191 A1 | | 7/2008 | Parekh et al. |
| 2008/0156709 A1 | | 7/2008 | Johnson |
| 2009/0178928 A1 | | 7/2009 | Groos et al. |
| 2009/0325269 A1 | | 12/2009 | Marschke |
| 2010/0028962 A1 | | 2/2010 | Hu et al. |
| 2010/0151098 A1 | | 6/2010 | Catchpole et al. |
| 2010/0173806 A1 | | 7/2010 | Fan et al. |
| 2010/0297749 A1 | | 11/2010 | Aravanis |
| 2011/0045528 A1 | | 2/2011 | Dhamwichukorn |
| 2011/0065940 A1 | | 3/2011 | Kahelin et al. |
| 2011/0138682 A1 | | 6/2011 | Demaris et al. |
| 2011/0167712 A1 | | 7/2011 | Brasil |
| 2011/0174734 A1 | | 7/2011 | Seibert et al. |
| 2011/0192792 A1 | | 8/2011 | Chew et al. |
| 2011/0225878 A1 | | 9/2011 | Moulijn et al. |
| 2012/0077255 A1 | | 3/2012 | Miranda et al. |
| 2012/0094340 A1 | | 4/2012 | Morgan |
| 2012/0159839 A1 | | 6/2012 | Koskinen et al. |
| 2012/0226061 A1 | | 9/2012 | Shepherd |
| 2013/0270187 A1 | | 10/2013 | Seibert et al. |
| 2013/0334137 A1 | | 12/2013 | Seibert et al. |
| 2014/0243573 A1 | | 8/2014 | Seibert et al. |
| 2015/0087877 A1 | | 3/2015 | Seibert et al. |

FOREIGN PATENT DOCUMENTS

| | | |
|---|---|---|
| EP | 1270063 A2 | 1/2003 |
| EP | 1859852 A1 | 5/2007 |
| JP | 2007209955 A | 8/2007 |
| WO | 9845019 A1 | 10/1998 |
| WO | 0166910 A1 | 9/2001 |
| WO | 2005100542 A1 | 10/2005 |
| WO | 2009094440 A1 | 7/2009 |
| WO | 2011088242 A1 | 7/2011 |

(56) References Cited

FOREIGN PATENT DOCUMENTS

| WO | 2013025260 A1 | 2/2013 |
|----|---------------|--------|
| WO | 2013188837 A1 | 12/2013 |
| WO | 2013188849 A1 | 12/2013 |

OTHER PUBLICATIONS

Australian Patent Office (ISA) International Search Report and Written Opinion for PCT/US2011/021185, dated Apr. 8, 2011, 21 pages.
Australian Patent Office (ISA) International Preliminary Report on Patentability for PCT/US2011/021185, dated Jul. 17, 2012, 13 pages.
Korean Intellectual Patent Office (ISA)—International Search Report and Written Opinion for PCT/US2013/046026, dated Sep. 23, 2013, 13 pages.
Korean Intellectual Patent Office (ISA)—International Search Report and Written Opinion for PCT/US2013/046007, dated Oct. 11, 2013, 11 pages.
Machine translation of European Patent Publ. EP1859852A1 (Nov. 28, 2007) entitled "Removal of hydrophile substances from biodiesel using membranes" (abstract, description and claims)—15 pp.
European Patent Office, Extended European Search Report for European Patent Appl. No. 13803446.7 (PCT/US2013/046007) dated May 19, 2015. 7 pp.
European Patent Office, Extended European Search Report for European Patent Appl. No. 13804988.7 (PCT/US2013/046026 dated Jun. 17, 2015. 7 pp.
Machine Translation of Japan Patent Application Publ. No. 2007-209955—Takeo, Yoshida, (Aug. 23, 2007), Abstract, Description and Claims. 38 pp.
Final Office Action mailed Jun. 15, 2016, for U.S. Appl. No. 13/918,766, 5 pages.
Non-Final Office Action mailed Jul. 5, 2016, for U.S. Appl. No. 14/052,516, 7 pages.
Non-Final Office Action mailed Aug. 25, 2016, for U.S. Appl. No. 13/918,766, 7 pages.
European Patent Office, Extended European Search Report for EP 13876440.2 dated Jan. 26, 2016—8 pp.

* cited by examiner

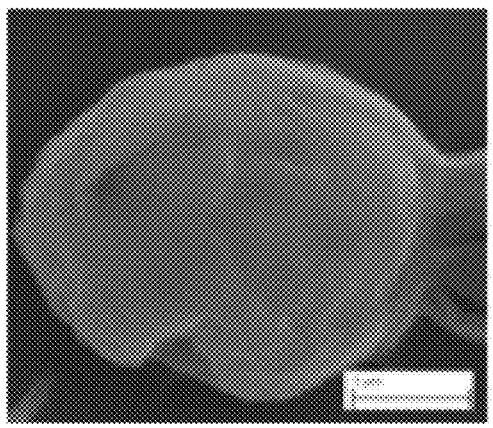 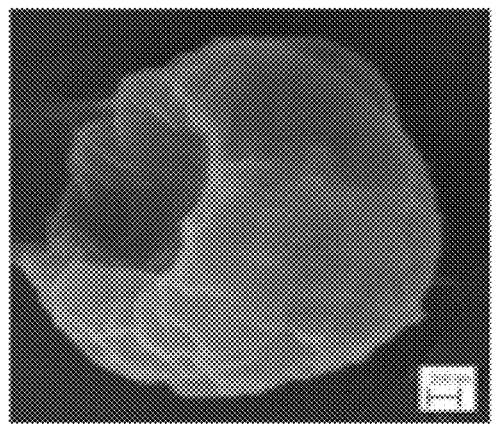
*FIG. 3A*          *FIG. 3B*
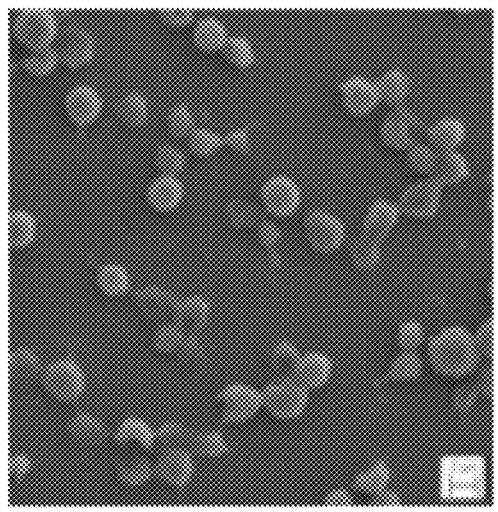 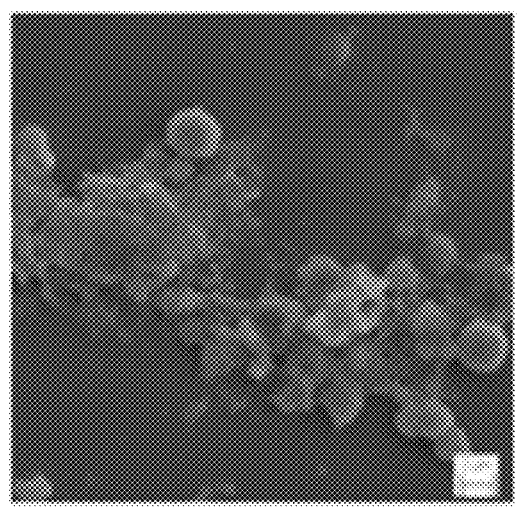
*FIG. 3C*          *FIG. 3D*

SIMULTANEOUS REMOVAL OF OIL AND GASES FROM LIQUID SOURCES USING A HOLLOW FIBER MEMBRANE

CROSS-REFERENCE TO RELATED APPLICATIONS

This application claims priority to and is a continuation-in-part of U.S. patent application Ser. No. 14/052,516, filed Oct. 11, 2013, which claims priority to U.S. Provisional Patent Application Ser. No. 61/659,918, filed Jun. 14, 2012 and U.S. Ser. No. 61/769,286, filed Feb. 26, 2013. This application is also a continuation-in-part and claims priority to U.S. patent application Ser. No. 13/918,766, filed Jun. 14, 2013; which is a continuation-in-part and claims priority to U.S. Ser. No. 13/358,897, filed Jan. 26, 2012 which is a continuation-in-part and claims priority to U.S. Ser. No. 13/280,028, filed Oct. 24, 2011 which is a continuation-in-part and claims priority to U.S. Ser. No. 13/006,342, filed Jan. 13, 2011 which claims priority to U.S. Provisional Application Ser. No. 61/295,607, filed Jan. 15, 2010, the entire contents of all of which are incorporated herein by reference.

TECHNICAL FIELD OF THE INVENTION

The present invention relates in general to the field of insoluble oil recovery from liquid sources, and more particularly, to a microporous membrane based method for recovering oil and gas.

STATEMENT OF FEDERALLY FUNDED RESEARCH

None.

BACKGROUND OF THE INVENTION

Without limiting the scope of the invention, its background is described in connection with recovery methods for insoluble and low solubility compounds having economic value from aqueous mixtures that may include one or more types of biological cells or cellular debris.

U.S. Pat. No. 3,956,112, issued to Lee, et al., is directed to a membrane solvent extraction. Briefly, this patent is said to describe a membrane solvent extraction system that is used to separate two substantially immiscible liquids and extract a solute through a solvent swollen membrane from one solvent liquid phase to the extracting solvent liquid without direct contact between the liquid phases. The membrane extraction method has advantages over conventional solvent extraction and may be applied as the mechanism in separation, purification, pollutant removal and recovery processes. This reference relies on liquid extraction, as the solvent swells the membrane to provide the separation.

U.S. Pat. No. 4,439,629 issued to Ruegg (1984) describes a process for extracting either or both beta-carotene or glycerine from algae containing these substances, especially from algae of the genera *Dunaliella*. According to the Ruegg patent either or both of beta-carotene or glycerine can be extracted from algae. If it is desired to extract beta-carotene, the algae are first treated with calcium hydroxide and then filtered. The residue from this filtration is treated with a beta-carotene solvent, which removes the beta-carotene from the residue and into the solvent. The beta-carotene can be recovered from the solvent by conventional means. If it is desired to extract glycerine, the filtrate from the treatment of the algae with calcium hydroxide is neutralized, concentrated and the residue from the solid is treated with a lower alkanol to remove glycerine from the residue.

U.S. Pat. No. 5,252,220, issued to Coughlin, et al., is directed to the preparation of analytical samples by liquid-liquid extraction using microporous hollow-fiber membranes. Briefly, this patent is said to teach a method and apparatus for accomplishing improved liquid-liquid extraction employing microporous hollow-fiber membranes. A number of possible modes of liquid-liquid extraction are possible according to the invention. As with the prior art, this patent relies on the interaction between two liquids, one on the contact side and one on the other side of the membrane for separation.

U.S. Pat. No. 5,378,639 issued to Rose et al. (1995) discloses a method for the solvent-extraction of β-carotene from an aqueous algal biomass suspension, whereby a vegetable oil which is immiscible with water is mixed with an aqueous biomass suspension, the biomass containing the β-carotene, to form a mixture of the organic phase and the aqueous suspension, whereby the β-carotene is caused to dissolve in the organic phase. This is followed by separation of the organic phase from the aqueous phase by passing the organic phase containing the dissolved β-carotene through a semi-permeable membrane to effect microfiltration or ultrafiltration of the organic phase. The membrane is of a material that is hydrophobic and the organic phase is passed through the membrane with a pressure drop across the membrane which is lower than that which causes the aqueous phase to pass through the membrane.

U.S. Pat. No. 5,938,922 issued to Fulk, Jr., et al., is directed to a contactor for degassing liquids. Briefly, these inventors teach a contactor for degassing liquids includes a perforated core, a plurality of microporous hollow fibers, and a shell, wherein the fibers surround the core and have two ends. The system for degassing liquids includes a source of liquid containing a gas, a source of vacuum, and the contactor.

U.S. Pat. No. 6,436,290, issued to Glassford is directed to a method and apparatus for separating mixtures of organic and aqueous liquid phases. Briefly, this patent is said to include a method and apparatus for separating a mixture containing an aqueous liquid and an immiscible organic phase using microporous hollow fibers. Such mixtures are separated into a substantially organic-free aqueous phase and a substantially aqueous-free organic phase. The mixture is pressurized in a controlled low shear manner to minimize emulsification as it is contacted with the fibers. Productivity is said to be enhanced by separating as a third product stream, a further organic phase containing only small amounts of an aqueous phase, which for some applications can usefully be combined with the substantially aqueous-free organic phase.

In contrast to the vacuum used in U.S. Pat. No. 5,938,922, U.S. Pat. No. 8,506,685, issued to Taylor, et al., is directed to a high-pressure liquid degassing membrane contactors and methods of manufacturing and use. Briefly, this patent teaches an improved liquid degassing membrane contactor or module in a high-pressure housing and at least one degassing cartridge therein. The high pressure housing is a standard, ASME certified, reverse osmosis (RO) or water purification pressure housing or vessel (made of, for example, polypropylene, polycarbonate, stainless steel, corrosion resistant filament wound fiberglass reinforced epoxy tubing, with pressure ratings of, for example, 150, 250, 300, 400, or 600 psi, and with, for example 4 or 6 ports, and an end cap at each end) and that the degassing cartridge is a self-contained, hollow-fiber membrane cartridge adapted to fit in the RO high pressure housing.

SUMMARY OF THE INVENTION

The present invention describes additional methods for coalescing insoluble oil from mixtures using a hydrophobic microporous hollow fiber membrane. In one embodiment, the present invention is an apparatus for removing oil from an oil-containing liquid comprising oil and gas comprising: a source of oil-containing liquid; and a membrane contactor system in fluid communication with the source of oil-containing liquid, the membrane contactor system comprising one or more membrane contactors having a first and a second surface, wherein the first surface coalesces oil and removes gas from the oil-containing liquid, and the oil and gas are collected on the second surface from the oil-containing liquid. In one aspect, the apparatus further comprises a solid removal system for removing small, medium and large solids from an oil/water mixture to form an oil and water stream containing only solids smaller than 30 microns, wherein the small, medium or large solids are removed with at least one of a sand filter, a rock filter, a porous ceramic material, a centrifuge, a mesh, a particulate filter, a sieve, a strainer, or gravity. In another aspect, the oil-containing liquid is at least one of an oil-rich stream, crude oil, transportation fuel, heating oil, refined petroleum products, petrochemicals, bio-oils, renewable oils, vegetable oils, reclaimed oils, waste oils, oil industry liquid streams, oil contaminated water or brine, drilling mud, produced water and oil sands tailings. In another aspect, the oil-containing liquid is at least one of: not subjected to gravity separation prior to processing, subjected to gravity separation prior to processing, or subjected to centrifugation prior to processing. In another aspect, the membrane contactor is pre-treated with a soak that is defined further as comprising a hydrophobic liquid soak or hydrophobic liquid circulation in the membrane contactor with the hydrophobic liquid on at least one of the first, the second, or both the first and second surfaces of the membrane contactor. In another aspect, the membrane contactor is pre-treated with a soak that is defined further as comprising contacting at least one of the first, the second, or both the first and second surfaces of the membrane contactor with an alcohol, followed by a caustic, followed by an acid, followed by drying with an inert gas, followed by an hydrophobic liquid soak or hydrophobic liquid circulation in the membrane contactor. In another aspect, the oil-containing liquid is processed by the system within 1, 2, 4, 6, 8, 12, 24, 26, 48 or 72 hours from removal of large solids. In another aspect, the membrane contactor is a hydrophobic membrane or membrane module that comprises hollow fiber microporous membranes. In another aspect, the membrane contactor is a hydrophobic hollow fiber membrane comprises polyethylene, polypropylene, polyolefins, polyvinyl chloride (PVC), amorphous polyethylene terephthalate (PET), polyolefin copolymers, poly(etheretherketone) type polymers, surface modified polymers, mixtures or combinations thereof or a surface modified polymer that comprises polymers modified chemically at one or more halogen groups by corona discharge or by ion embedding techniques. In another aspect, the oil separated from the oil-containing liquid by the membrane contactor is coalesced with a counterflowing fluid, wherein the at least one counterflowing fluid selected from hydrophobic liquid, non-polar fluid, alkanes such as hexane, aromatic fluid such as benzene, toluene, ethers such as diethyl ether, halogenated fluid such as chloroform, dichloromethane, and esters such as ethyl acetate. In another aspect, the apparatus further comprises a membrane cleaning system that removes debris that clogs the membrane contactor system, and optionally comprising a clog detector that detects a clog at the membrane contactor system. In another aspect, the apparatus further comprises an oil and gas separator in fluid communication with second surface of the membrane contactor. This claim serves to say that an oil and gas separator can be downstream. In another aspect, the apparatus operates at less than 100 psi. In another aspect, the apparatus operates at 5, 10, 20, 30, 40, 50, 60, 70, 80, 90, 95, 5 to 95, 10 to 90, 20 to 80, 30 to 70, 40 to 50, 5 to 15, 10 to 30, 20 to 40, 40 to 60, 50 to 70, 60 to 80, 80 to 90, or 90 to 95 psi. In another aspect, the gas removed is selected from at least one of $O_2$, $CO_2$, $H_2S$, $N_2$, CO, saturated or unsaturated light hydrocarbons, methane, ethane, propane, butane, pentane, ethylene, propylene, or hexane. In another aspect, the oil and gas are separated from the oil-containing liquid in a single step. In another aspect, a collection fluid is in contact with the second surface of the membrane contactor. In another aspect, a vacuum is in contact with the second surface of the membrane.

Another embodiment of the present invention includes a method for isolating oil from an oil-containing liquid comprising the steps of: obtaining an oil-containing liquid that comprises oil and one or more gases; contacting the oil-containing liquid onto a first surface of one or more membrane contactors to coalesce the oil and gas on the first surface; and collecting the coalesced oil and gas from the oil-containing liquid on the second surface of the membrane contactor. In one aspect, the method further comprises a solid removal system for removing small, medium and large solids from an oil/water mixture to form an oil and water stream containing only solids smaller than 30 microns, wherein the small, medium or large solids are removed with at least one of a sand filter, a rock filter, a porous ceramic material, a centrifuge, a mesh, a particulate filter, a sieve, a strainer, or gravity. In another aspect, the oil-containing liquid is at least one of an oil-rich stream, crude oil, transportation fuel, heating oil, refined petroleum products, petrochemicals, bio-oils, fermentation broth, growth media, renewable oils, vegetable oils, reclaimed oils, waste oils, oil industry liquid streams, oil contaminated water or brine, drilling mud, produced water and oil sands tailings. In another aspect, the oil-containing liquid is at least one of: not subjected to gravity separation prior to processing, subjected to gravity separation prior to processing, or subjected to centrifugation prior to processing. In another aspect, the oil-containing liquid is processed by the system within 1, 2, 4, 6, 8, 12, 24, 26, 48 or 72 hours from removal of large solids. In another aspect, the membrane contactor is a hydrophobic membrane or membrane module comprises hollow fiber microporous membranes. In another aspect, the membrane contactor is a hydrophobic hollow fiber membrane comprises polyethylene, polypropylene, polyolefins, polyvinyl chloride (PVC), amorphous polyethylene terephthalate (PET), polyolefin copolymers, poly(etheretherketone) type polymers, surface modified polymers, mixtures or combinations thereof or a surface modified polymer that comprises polymers modified chemically at one or more halogen groups by corona discharge or by ion embedding techniques. In another aspect, the oil separated from the oil-containing liquid by the membrane contactor is coalesced with a counterflowing fluid, wherein the at least one counterflowing fluid selected from hydrophobic liquid, non-polar fluid, alkanes such as hexane, aromatic fluid such as benzene, toluene, ethers such as diethyl ether, halogenated fluid such as chloroform, dichloromethane, and esters such as ethyl acetate. In another aspect, the method further comprises a membrane cleaning system that removes debris that clogs the membrane contactor system, and optionally comprising a clog detector that detects a clog at the membrane contactor system. In another aspect, the method further comprises the step of separating the oil from the gas and collecting the gas for further use. In another aspect, the method further comprises the step of separating the oil from the gas by exposing the coalesced oil to reduced pressure, in a vessel, tank or membrane. In another aspect, the gas removed is selected from at least one of O2, CO2, H2S, methane, ethane, propane, butane, pentane, or hexane. In another aspect, the oil and gas are separated from the oil-containing liquid in a single step. In another aspect, the method further comprises the step of flowing a collection fluid on the second surface of the membrane contactor. In another aspect, the method further comprises the step of monitoring a change in the pH, ionic strength, oxidative state, electrical resistance, charge, or contamination of the oil-containing liquid to determine the removal of gas and oil from the oil-containing liquid. In another aspect, the method operates at 5, 10, 20, 30, 40, 50, 60, 70, 80, 90, 95, 5 to 95, 10 to 90, 20 to 80, 30 to 70, 40 to 50, 5 to 15, 10 to 30, 20 to 40, 40 to 60, 50 to 70, 60 to 80, 80 to 90, or 90 to 95 psi. In another aspect, the method further comprises the steps of determining the step of monitoring a change in the pH, ionic strength, oxidative state, electrical resistance, charge, or contamination of the oil-containing liquid and depending on the change adding one or more ions, antibiotics, oxidizers, reducers, surfactants, detergents, chelators, hydrophilic liquids, hydrophobic liquid, acids, or bases.

BRIEF DESCRIPTION OF THE DRAWINGS

For a more complete understanding of the features and advantages of the present invention, reference is now made to the detailed description of the invention along with the accompanying figures and in which:

FIGS. 3A and 3B shows photographs of an algal cell prior to (3A) and after lysing (3B);

FIGS. 3C and 3D shows photographs of algal cells prior to (3C) and after lysing (3D);

DETAILED DESCRIPTION OF THE INVENTION

Figure 1:
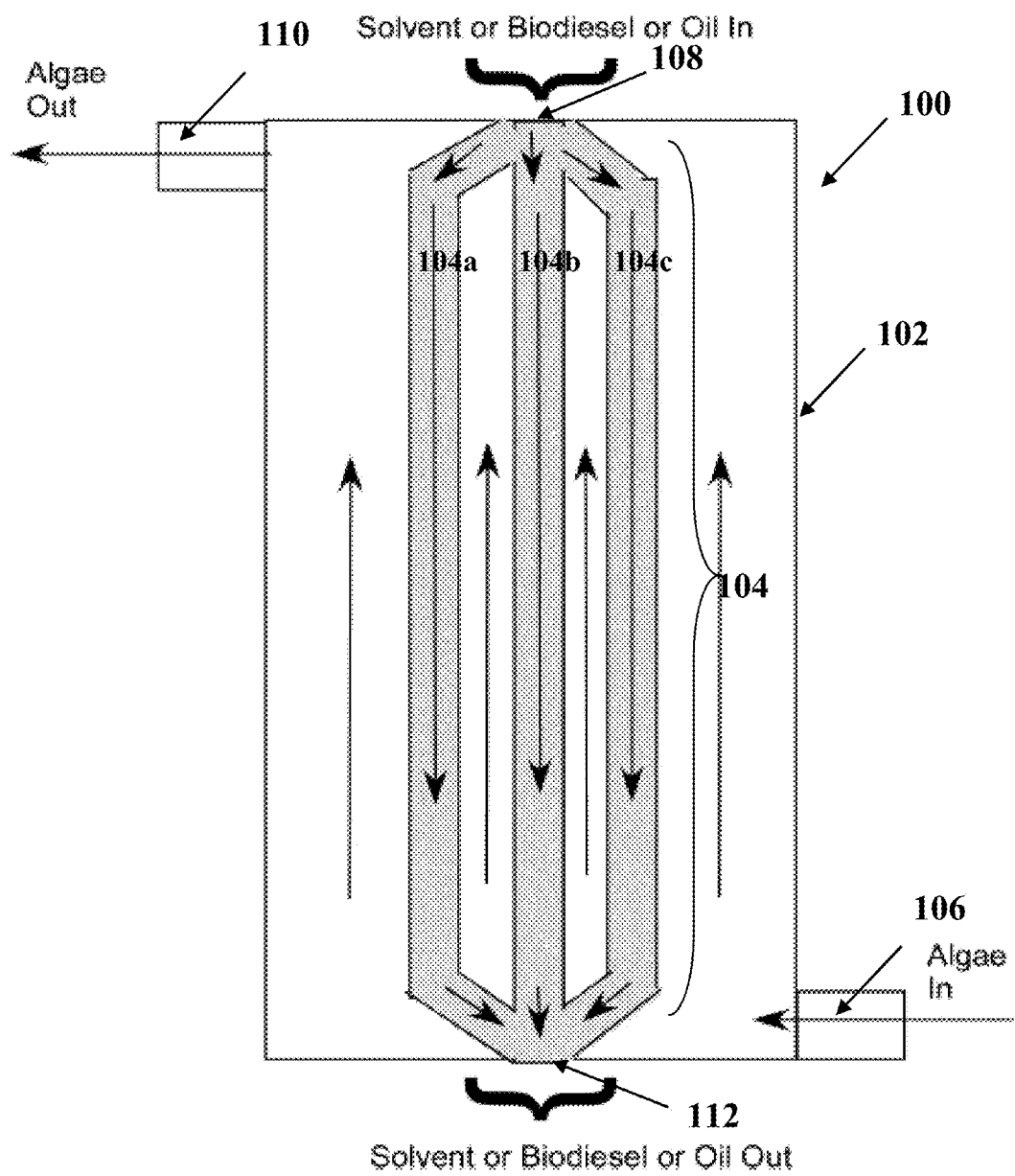
FIG. 1 is a schematic showing the method and the algal oil recovery principle as described in the embodiments of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term "aqueous slurry" encompasses water based liquids containing any of the following in any combination; insoluble oils (hydrocarbons and hydrocarbon-rich molecules of commercial value), living, dead, damaged and/or broken cells (or not), proteins and other cellular debris, including sugars, DNA, RNA, etc. The slurry may also contain a solvent that was used to pre-treat cells to liberate compounds of interest.

As used herein, the term "oil" refers to a single hydrocarbon or hydrocarbon-rich molecule including a complex mixture of lipids, hydrocarbons, free fatty acids, triglycerides, aldehydes, etc. The term oil also includes, e.g., $C_8$ (jet fuel compatible), $C_{60}$ (motor oil compatible) and oils that are odd- or even-chain oils (and mixtures thereof), e.g., from $C_6$ to $C_{120}$. Some compounds are pure hydrocarbons, some have oxygen. Oil also comprises hydrophobic or lipophilic compounds.

As used herein, the term "pumping" includes all methods of pumping, propelling, or feeding fluid from one location to another employing hoses, lines, tubes, ducts, pipes, or pipelines including under pressure. It also includes gravity flow of fluid.

Unlike the prior art, the present invention is based on the discovery that it is possible to feed two immiscible liquids on one side of a hollow fiber membrane, e.g., the shell-side, to cause separation of oils using coalescence versus liquid extraction. By contrast, the prior art, e.g., U.S. Pat. Nos. 3,956,112; 5,252,220; and 6,436,290, are feeding one immiscible liquid on the shell side.

U.S. Pat. No. 3,956,112, issued to Lee, et al., is directed to a membrane solvent extraction. Briefly, this patent is said to describe a membrane solvent extraction system that is used to separate a dissolved solute from one liquid referred to as the carrier and into a second liquid, which is immiscible with the carrier and is referred to as the solvent. Therefore, the hollow fiber membrane is used to extract a solute through a solvent swollen membrane from one solvent liquid phase to the extracting solvent liquid with direct contact between the liquid phases only within the porous walls. The membrane extraction method has potential advantages over conventional solvent extraction in that it does not require a density difference and provides a large amount of contact area. The membrane extraction contactor and may be applied to molecular diffusion based mass transfer separation processes as the mechanism in separation, purification, pollutant removal and recovery processes. The Lee patent relies on liquid extraction, as the solvent swells the membrane filling the pores and providing a diffusional process to extract a dissolved solute from an immiscible liquid carrier.

The present invention uses coalescence to achieve the transfer of oil across the membrane, the component to be removed is essentially insoluble in the feed and we are recovering only the insoluble liquid. In liquid extraction, the component to be removed is dissolved in the feed and the dissolved material is recovered.

In the present invention, the second immiscible liquid (hydrocarbon) is removed from the aqueous feed by coalescence on the surface of the fiber. By contrast, the prior art is removing a dissolved solute (possibly a hydrocarbon).

Finally, unlike the prior art, the present invention does not rely on diffusional mass transfer, but rather, wettability of the insoluble liquid on the fiber. The liquid extraction of the prior art relies on liquid-liquid partitioning, diffusional mass transfer and mass transfer resistances.

In conventional liquid-liquid extraction and coalescing processes involving large drops of oil (greater than 1,000 microns), the mixing and separation of the oil and water phases by a dispersive process is routinely practiced with relative ease. However, when the oil drops are significantly smaller in diameter (less than 10 microns) and solids are present, the complete separation of the immiscible liquids is extremely difficult, if not impossible using dispersive methods routinely practiced for larger oil droplets. When routine methods are applied to try to recover small oil droplets from water in the presence of solids (such as cells or cell debris), a solid-liquid-liquid emulsion layer is created resulting in an incomplete and inefficient separation of the two liquids. Therefore a new process is required that will allow for a more efficient separation and elimination of the solid-liquid-liquid-emulsion problem. The process of the present invention enables the recovery of micron and submicron sized insoluble oil drops from an aqueous slurry utilizing a novel non-dispersive process.

A non-dispersive process promotes a one-way flow of specific compounds into and through a membrane to remove the compounds from the shell side feed to the tube side. A non-dispersive separation process is currently used to remove dissolved gases from liquids such as the removal of dissolved oxygen from water to produce ultra pure water for the microelectronics industry. The present invention is a first successful demonstration of the application of non-dispersive processes to recover insoluble oil from water or aqueous slurries. The non-dispersive process disclosed herein uses a microporous hollow fiber membrane composed of hydrophobic fibers. The aqueous slurry containing the insoluble oil is fed on the shell-side of the hollow fiber module and a hydrocarbon-appropriate liquid, for example, a biodiesel, or similar oil recovered in previous application of the described process is fed on the tube side of the hollow fiber module as a recovery fluid. The aqueous phase passes around the outside of the large surface area of hydrophobic fibers containing the hydrophobic recovery fluid as it passes through and eventually out of the module. As the aqueous liquid with the insoluble oil drops passes through the module, the insoluble oil droplets coalesce on to the walls of the hydrophobic fibers and dissolve into the hydrocarbon-appropriate recovery fluid on the tube side of the module and are carried out of the module with the recovery fluid. In this process, the tube side recovery fluid does not make prolonged contact with the aqueous phase or disperse into the aqueous phase. The absence of this mixing as hypothesized by the inventors prevents the formation of a solid-liquid-liquid emulsion, when solids were present, allowing insoluble oil to be recovered efficiently from an aqueous slurry containing solids. The above hypothesis was successfully demonstrated herein to efficiently recover insoluble oil from an aqueous mixture including cells without the formation of a solid-liquid-liquid emulsion.

In typical membrane filtration processes, small amounts of solids quickly build up on the surface of the membrane (commonly called membrane fouling) reducing the efficiency and cost effectiveness of the filtration process. In the process discovered and disclosed herein using the microporous hollow fiber membrane module, membrane fouling is not a concern within specific operating parameters. The present invention shows that if the module is operated using hydrophilic cells that are small enough to pass through the dimensions of the module, and an appropriate pressure differential is maintained between the aqueous fluid and recovery fluid, then the hydrophilic cells flow through the module and are repelled from the surface of the membrane because the membrane is coated with a hydrophobic recovery fluid. The results presented herein at the prescribed operating conditions do not indicate any evidence of membrane fouling.

The novel recovery process of the present invention utilizes a non-dispersive method to coalesce and recover an insoluble oil from an aqueous slurry. The technique utilizes a microporous hollow fiber membrane contactor. The inventors have tested the Liqui-Cel Extra Flow Contactor, commercially used for gas/liquid contacting, to obtain >80% recovery efficiency and process concentrates up to 10% bio-cellular solids without membrane fouling. The novel technique of the present invention utilizes the large coalescing area provided by the surface of the microporous hollow fibers when filled with a hydrophobic recovery fluid and minimizes the actual contact of the solvent with the (e.g. yeast) biomass and aqueous phase.

The novel recovery process described herein can be coupled with a variety of appropriate recovery fluids for recovery of insoluble compounds, depending upon the types of compound or compounds to be recovered. The choice of recovery fluid will impact both the sub-set of compounds recovered from the aqueous slurry as well as the downstream steps needed to economically and efficiently use compounds from the recovery fluid. Differential recovery of desired molecules, for example, recovery of non-polar oils, but not more polar oils, can be achieved by choice of recovery fluid. Segregation of non-polar oils from polar oils, specifically polar oils containing phosphorous (e.g., phospholipids), is highly advantageous as phosphorus containing compounds complicate both the refining and transesterification processes used to create transportation fuels.

Downstream steps needed to recover desired molecules from the recovery fluid are also application specific. If heptane is used as the recovery fluid, compounds of interest may be recovered by distillation without the need of a steam stripper. If biodiesel (Fatty Acid Methyl Ester [FAME]) is used as the recovery fluid, e.g., recovered oils may not require processing prior to transesterification to FAME. Importantly, the present invention can also uses a "self" oil that has been previously recovered from an aqueous slurry as the recovery fluid thereby completely eliminating the need and expense of having to separate the recovered compounds from the recovery fluid. In this application, the recovery fluid is a quantity of oil derived from previously processed aqueous slurry or extracted by a different method. The microporous hollow fiber membrane contactor as described in the present invention is small, portable, economical and is capable of handling large aqueous slurry feed rates.

In another embodiment, the present invention describes a method of recovering one or more hydrocarbons or hydrocarbon-rich molecules (e.g., farnesene, squalane, aldehydes, triglycerides, diglycerides, etc.) or combinations thereof, from an aqueous preparation using one or more hydrophobic membranes or membrane modules. Without limiting the scope of the invention, an example includes recovery of hydrocarbon and hydrocarbon-rich molecules produced by microbial fermentation. Microbial fermentation processes are described in which organisms including algae, yeast, *E. coli*, fungi, etc. are used to metabolize carbon sources (e.g., sugars, sugarcane bagasse, glycerol, etc.) into hydrocarbons and hydrocarbon-rich molecules that are secreted from (or accumulate within) the cells. Such organisms are expected, by design, to produce physically small oil droplets; the inventors hypothesized that these droplets will not readily resolve from water by gravity alone and that the process described herein will be immediately applicable to recover insoluble oils produced by microbial platforms. The companies commercializing microbial fermentation to oil technologies have implied that the recovery of the oil product is trivial, but emerging company disclosures and scientific data suggest recovering the oil from the aqueous growth media is a mission-critical problem. Technologies currently in use, for e.g. centrifugal force sufficient to pellet *E. coli* cells are not sufficient to break the oil/water emulsion that is created in the aqueous growth media by the hydrocarbon-producing *E. coli*.

In addition to the steps listed herein above the method of the present invention further involves the steps of collecting the one or more recovered algal lipid components, algal oils or both in a collection vessel, recycling the separated solvent by pumping through the one or more membranes or membrane modules to process a subsequent batch of lysed algae, converting the one or more recovered algal lipid components, algal oils or both in the collection vessel to Fatty Acid Methyl Esters (FAMEs) or a biodiesel by transesterification or alternatively, refinery-based processing such as hydrocracking or pyrolysis, and processing the first stream comprising the algal biomass by drying the algal biomass to be optionally used as animal feed, feedstock for chemical production, or for energy generation. In the event one or more solvents are used as the recovery fluids, the method includes an optional step for separating the one or more recovered algal lipid components, algal oils or both from the one or more solvents. The lysed algal preparation used in the method of the present invention comprises a concentrate, a slurry, a suspension, a dispersion, an emulsion, a solution or any combinations thereof.

In one aspect the hydrophobic membrane or membrane module comprises microporous hollow fiber membranes, selected from polyethylene, polypropylene, polyolefins, polyvinyl chloride (PVC), amorphous Polyethylene terephthalate (PET), polyolefin copolymers, poly(etheretherketone) type polymers, surface modified polymers, mixtures or combinations thereof. The surface modified polymers comprise polymers modified chemically at one or more halogen groups or by corona discharge or by ion embedding techniques. In another aspect of the method of the present invention the algae are selected from the group consisting of the diatoms (bacillariophytes), green algae (chlorophytes), blue-green algae (cyanophytes), golden-brown algae (chrysophytes), haptophytes, *Amphipleura, Amphora, Chaetoceros, Cyclotella, Cymbella, Fragilaria, Hantzschia, Navicula, Nitzschia, Phaeodactylum, Thalassiosira Ankistrodesmus, Botryococcus, Chlorella, Chlorococcum, Dunaliella, Monoraphidium, Oocystis, Scenedesmus, Nanochlorposis, Tetraselmis, Chlorella, Dunaliella, Oscillatoria, Synechococcus, Boekelovia, Isochysis* and *Pleurochysis*.

In yet another aspect of the method of the present invention, when using one or more counterflowing recovery fluids, these may comprise hydrophobic liquids, alkanes such as hexane, aromatic solvents such as benzene, toluene, ethers such as diethyl ether, halogenated solvents such as chloroform, dichloromethane, and esters such as ethyl acetate. In one aspect the counterflowing non-polar oil comprises algal oils, components of biodiesels selected from monoglycerides, diglycerides, triglycerides, and fatty acid methyl esters.

The present invention describes a method for recovering algae oil from lysed algae concentrate using hydrophobic microporous hollow fiber membrane followed by recovery of the algal oil using a recovery fluid which can be a solvent, a hydrophobic liquid, a biodiesel, an algal oil or mixtures thereof. The technique of the present invention does not require dispersive contacting of the lysed algae concentrate and recovery fluid. The use of a hydrophobic microporous hollow fiber membrane provides a non-dispersive method of coalescing and recovering the algal oil. The lysed algae concentrate is fed on the shell side while algal oil or the recovery fluid is fed on the fiber side. The recovery fluid acts to sweep and remove the coalesced oil within the tube surface of the hollow fibers. A simple schematic representation of the method of the present invention is depicted in FIG. 1.

FIG. 1 shows an algal oil recovery unit 100. The unit 100 comprises a housing 102, within which is contained a membrane module 104 comprising a plurality of microporous hollow fiber membrane units depicted as 104a, 104b, and 104c. The unit has two inlet ports 106 and 108. The lysed algal preparation is fed (pumped) through port 106. A recovery fluid is pumped through inlet port 108. The recovery fluid can be a solvent, a biodiesel, an algal oil or mixtures thereof. The algal preparation counterflows with the recovery fluid flowing inside the microporous hollow fiber membranes 104a, 104b, and 104c. The algal oils or lipid coalesce on the surface of the hollow fiber membranes and are swept by and recovered by the recovery fluid and exit the unit 100 through the outlet port 110. The exit stream is taken for further processing (e.g. solvent recovery) if necessary. The recovery fluid flows out of the unit 100 through port 112.

The method of the present invention using a compatible mixture as the recovery fluid eliminates the need of a distillation system or a stripper to recover the solvent thereby reducing the capital and operating cost of the overall oil recovery process.

A wide variety of organisms can be used to generate oils and lipids that can be recovered with the present invention. Non-limiting examples of algae and microalgae may be grown and used with the present invention including one or more members of the following divisions: *Chlorophyta, Cyanophyta* (Cyanobacteria), and *Heterokontophyt*. Non-limiting examples of classes of microalgae that may be used with the present invention include: *Bacillariophyceae, Eustigmatophyceae,* and *Chrysophyceae*. Non-limiting examples of genera of microalgae used with the methods of the invention include: *Nannochloropsis, Chlorella, Dunaliella, Scenedesmus, Selenastrum, Oscillatoria, Phormidium, Spirulina, Amphora,* and *Ochromonas*. Non-limiting examples of microalgae species that can be used with the present invention include: *Achnanthes orientalis, Agmenellum* spp., *Amphiprora hyaline, Amphora coffeiformis, Amphora coffeiformis* var. *linea, Amphora coffeiformis* var. *punctata, Amphora coffeiformis* var. *taylori, Amphora coffeiformis* var. *tenuis, Amphora delicatissima, Amphora delicatissima* var. *capitata, Amphora* sp., *Anabaena, Ankistrodesmus, Ankistrodesmus falcatus, Boekelovia hooglandii, Borodinella* sp., *Botryococcus braunii, Botryococcus sudeticus, Bracteococcus minor, Bracteococcus medionucleatus, Carteria, Chaetoceros gracilis, Chaetoceros muelleri, Chaetoceros muelleri* var. *subsalsum, Chaetoceros* sp., *Chlamydomas perigranulata, Chlorella anitrata, Chlorella antarctica, Chlorella aureoviridis, Chlorella candida, Chlorella capsulate, Chlorella desiccate, Chlorella ellipsoidea, Chlorella emersonii, Chlorella fusca, Chlorella fusca* var. *vacuolate, Chlorella glucotropha, Chlorella infusionum, Chlorella infusionum* var. *actophila, Chlorella infusionum* var. *auxenophila, Chlorella kessleri, Chlorella lobophora, Chlorella luteoviridis, Chlorella luteoviridis* var. *aureoviridis, Chlorella luteoviridis* var. *lutescens, Chlorella miniata, Chlorella minutissima, Chlorella mutabilis, Chlorella nocturna, Chlorella ovalis, Chlorella parva, Chlorella photophila, Chlorella pringsheimii, Chlorella protothecoides, Chlorella protothecoides* var. *acidicola, Chlorella regularis, Chlorella regularis* var. *minima, Chlorella regularis* var. *umbricata, Chlorella reisiglii, Chlorella saccharophila, Chlorella saccharophila* var. *ellipsoidea, Chlorella salina, Chlorella simplex, Chlorella sorokiniana, Chlorella* sp., *Chlorella sphaerica, Chlorella stigmatophora, Chlorella vanniellii, Chlorella vulgaris, Chlorella vulgaris* fo. *tertia, Chlorella vulgaris* var. *autotrophica, Chlorella vulgaris* var. *viridis, Chlorella vulgaris* var. *vulgaris, Chlorella vulgaris* var. *vulgaris* fo. *tertia, Chlorella vulgaris* var. *vulgaris* fo. *viridis, Chlorella xanthella, Chlorella zofingiensis, Chlorella trebouxioides, Chlorella vulgaris, Chlorococcum infusionum, Chlorococcum* sp., *Chlorogonium, Chroomonas* sp., *Chrysosphaera* sp., *Cricosphaera* sp., *Crypthecodinium cohnii, Cryptomonas* sp., *Cyclotella cryptica, Cyclotella meneghiniana, Cyclotella* sp., *Dunaliella* sp., *Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta, Eremosphaera viridis, Eremosphaera* sp., *Effipsoidon* sp., *Euglena* spp., *Franceia* sp., *Fragilaria crotonensis, Fragilaria* sp., *Gleocapsa* sp., *Gloeothamnion* sp., *Haematococcus pluvialis, Hymenomonas* sp., *lsochrysis* aff. *galbana, lsochrysis galbana, Lepocinclis, Micractinium, Micractinium, Monoraphidium minutum, Monoraphidium* sp., *Nannochloris* sp., *Nannochloropsis salina, Nannochloropsis* sp., *Navicula acceptata, Navicula biskanterae, Navicula pseudotenelloides, Navicula pelliculosa, Navicula saprophila, Navicula* sp., *Nephrochloris* sp., *Nephroselmis* sp., *Nitschia communis, Nitzschia alexandrine, Nitzschia closterium, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitzschia quadrangular, Nitzschia* sp., *Ochromonas* sp., *Oocystis parva, Oocystis pusilla, Oocystis* sp., *Oscillatoria limnetica, Oscillatoria* sp., *Oscillatoria subbrevis, Parachlorella kessleri, Pascheria acidophila, Pavlova* sp., *Phaeodactylum tricomutum, Phagus, Phormidium, Platymonas* sp., *Pleurochrysis carterae, Pleurochrysis dentate, Pleurochrysis* sp., *Prototheca wickerhamii, Prototheca stagnora, Prototheca portoricensis, Prototheca moriformis, Prototheca zopfii, Pseudochlorella aquatica, Pyramimonas* sp., *Pyrobotrys, Rhodococcus opacus, Sarcinoid chrysophyte, Scenedesmus armatus, Schizochytrium, Spirogyra, Spirulina platensis, Stichococcus* sp., *Synechococcus* sp., *Synechocystisf, Tagetes erecta, Tagetes patula, Tetraedron, Tetraselmis* sp., *Tetraselmis suecica, Thalassiosira weissflogii,* and *Viridiella fridericiana*.

Other sources for biomass can be a wild type or genetically modified fungus. Non-limiting examples of fungi that may be used with the present invention include: *Mortierella, Mortierrla vinacea, Mortierella alpine, Pythium debaryanum, Mucor circinelloides, Aspergillus ochraceus, Aspergillus terreus, Penicillium iilacinum, Hensenulo, Chaetomium, Cladosporium, Malbranchea, Rhizopus,* and *Pythium*. As the source of biomass is not limited using the devices and methods of the present invention can be wild type or genetically modified yeast. Non-limiting examples of yeast that can be used with the present invention include *Cryptococcus curvatus, Cryptococcus terricolus, Lipomyces starkeyi, Lipomyces lipofer, Endomycopsis vernalis, Rhodotorula glutinis, Rhodotorula gracilis, Candida* 107, *Saccharomyces paradoxus, Saccharomyces mikatae, Saccharomyces bayanus, Saccharomyces cerevisiae,* any *Cryptococcus, C. neoformans, C. bogoriensis, Yarrowia lipolytica, Apiotrichum curvatum, T. bombicola, T. apicola, T. petrophilum, C. tropicalis, C. lipolytica,* and *Candida* sp., e.g., *Candida albicans*.

The biomass can even be any bacteria that generate lipids, oils, proteins, and carbohydrates, whether naturally or by genetic engineering. Non-limiting examples of bacteria that can be used with the present invention include *Escherichia coli, Acinetobacter* sp. any actinomycete, *Mycobacterium tuberculosis,* any streptomycete, *Acinetobacter calcoaceticus, P. aeruginosa, Pseudomonas* sp., *R. erythropolis, N. erthopolis, Mycobacterium* sp., *B.., U. zeae, U. maydis, B. lichenformis, S. marcescens, P. fluorescens, B. subtilis, B.*

*brevis, B. polmyma, C. lepus, N. erthropolis, T. thiooxidans, D. polymorphis, P. aeruginosa* and *Rhodococcus opacus*.

While algae make oil there is no simple and economical method for extracting the oil directly from an aqueous slurry. Drying algae is usually needed for solvent extraction and the biomass is exposed to toxic solvents. Other methods such as supercritical extraction are uneconomical for commodity products such as fuel. Solvent extraction is somewhat promising but requires distillation of an extract to separate the solvent from the oil. Also, a steam stripper is usually required to recover the residual solvent dissolved or entrained within the exiting algal concentrate. The solvent extraction technique requires contactor equipment or phase separation equipment, a distillation system and a steam stripper along with varying heat exchangers, surge tanks and pumps. Also steam and cooling water are required. The process described herein only requires a membrane system with pumps and tanks; the oil is coalesced, not extracted. No steam or cooling water is required.

Processing Alternatives: After selection of the appropriate solvent, the next step is to determine whether to extract algae oil from "wet" or "dry" algae. The "dry" process requires dewatering and evaporating the water from the algae biomass and then lysing the algae. Lysing is a process of breaking the cell wall and opening the cell. Solvent may be contacted with the dry algae in special counter current leaching equipment. The solvent and extracted algae oil is separated in a vacuum distillation tower or evaporator. The remaining algae biomass with residual solvent is fed to a special evaporator to remove and recover the solvent and to dry the algae biomass again. The "dry" process suffers from having to dry the algae a second time when the solvent must be evaporated away, handling a high solids stream in multiple steps, and potentially leaving solvent in the residual algae solids.

The "wet" process requires lysing and extraction of the algae concentrate. The wet process requires an excellent lysing technique followed by a solvent extraction process, which provides adequate mass transfer area for dissolving/coalescing the non-polar lipids. The "wet" process offers the advantages of drying the algae only once and leaving less residual solvent in the algae biomass. To minimize the processing cost, the "wet" process appears to offer significant advantages.

The present invention focuses on the "wet" process and the novel non-dispersive contactor used to coalesce and dissolve the desirable non-polar lipids.

Figure 2:
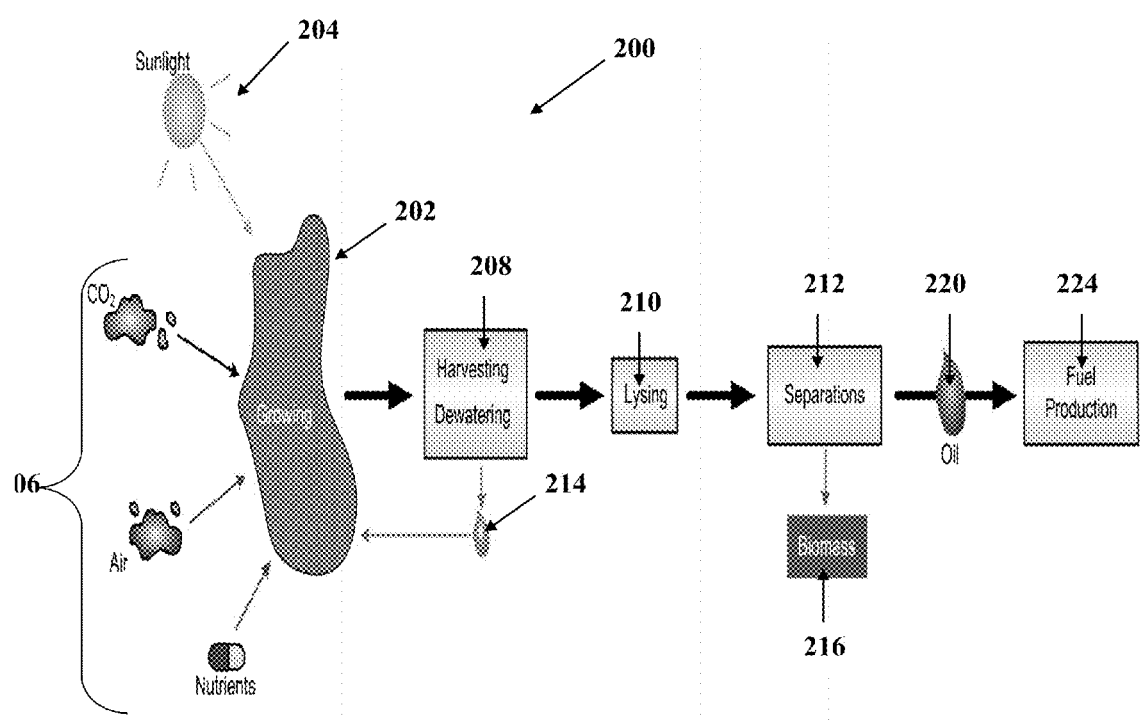
FIG. 2 is a schematic of a general algal oil production process.

As shown in FIG. 2 a complete extraction process 200 begins with the oil extraction step 212 followed by the algae concentration 208 and lysing 210 steps. After growing and initial harvesting under sunlight 204, from the pond 202 the dilute algae feed is concentrated significantly. The microbes such as the algae, media and/or water are returned at step 214. The typical algae concentration obtained from the pond 202 generally ranges from 100 to 300 mg dried algae/liter of solution. The goal of the concentration step 208 is to remove and recycle the water 214 back to the pond. Concentration methods 208 vary from centrifugation to flocculation/settling of the algae. To maximize lysing and oil recovery efficiency, it is important that concentrate being fed for lysing is not flocculated. After the concentration step 208, the algae concentrate is sent to the lysing 210 processing step where the algae cell is mechanically or electromechanically broken, thus exposing and freeing the non-polar oil. Various techniques may be used to mechanically or electrically compress and decompress to break the cell. In general after lysing, 212 the algae cell can be disintegrated or opened-up as shown in FIG. 3. FIGS. 3A and 3C shows photographs of an alga cell prior to lysing and FIGS. 3C and 3D show photographs of algal cells prior after lysing.

Once the oil has been freed from inside the algae cell, the oil will not simply separate from the cellular biomass due to density differences. Also since the equivalent diameters of most microalgae are extremely small and on the order of 1-5 microns, the oil drop diameter is often much less than 1 micron. Such oil drops do not rise or coalesce with other drops very well and can form a stable emulsion. When solid algae biomass 216 is added to the mixture, the recovery of the oil is even more difficult. Therefore simple gravitational phase settling is not a viable oil separation option after lysing.

After lysing, the algae concentrate is fed to the separations step 212 where algae oil 220 is separated from the wet algal biomass 216 to produce fuel 214. The biomass 216 may be sent for further drying and will be used for animal feed or processed further for energy generation applications.

Figure 4:
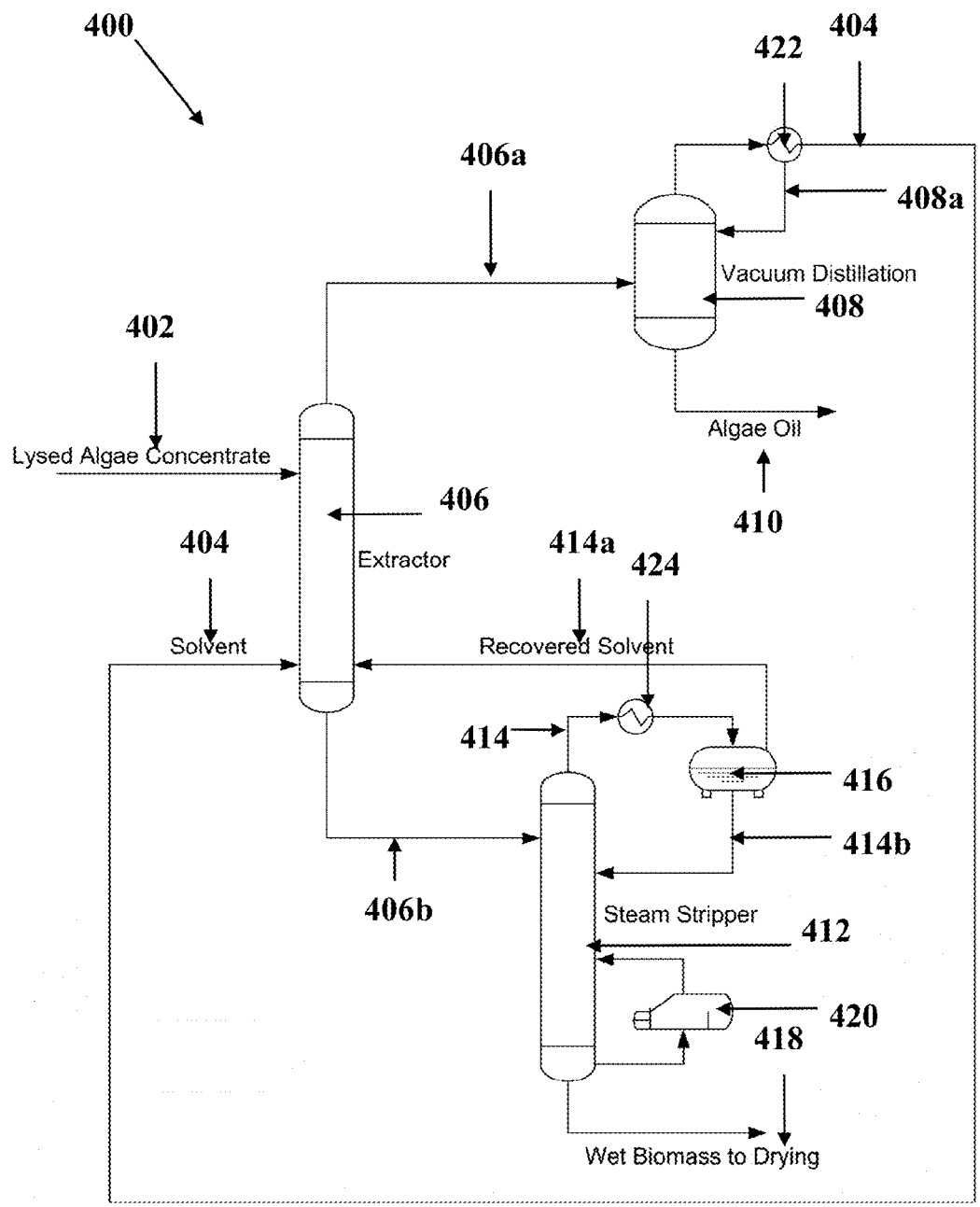
FIG. 4 is a flow diagram of a general algae oil recovery process.

As shown in FIG. 4, the typical solvent extraction process involves 1) an extraction step to recover algae oil from the lysed biomass, 2) a vacuum distillation or evaporation step to separate the oil and solvent where the solvent is returned to step 1, and 3) if necessary, steam stripping step to recover the dissolved and entrained solvent leaving the extraction step with the algal biomass.

FIG. 4 a flow diagram 400 of a general algae oil extraction process using a conventional dispersive extraction column 406. Lysed algal concentrate 402 and solvent 404 is fed to a column extractor 406 to extract the algal oils and lipids 408. Stream 406a comprises the solvent 404 containing the algal oils and lipids. Stream 406a is then fed to a vacuum distillation unit 408 to recover the solvent 404 and the algal oil 410. The separated solvent without any oil or other constituents 404 is fed back to the extractor 406. In the event it needs further purification (separation), the solvent 404 is fed back to the vacuum distillation unit 408 (via stream 408a). A second stream 406b from the extractor 406 comprises the algal biomass, solids, and residual solvent. Stream 406b is passed through a stream stripper 412, to separate the wet biomass 418 and other solids from the solvent 404. The wet biomass 418 is subjected to further drying. The recovered solvent 414 is collected in a decanting vessel 416 before being recycled 420 back to the extractor 406 via stream 414a and can be controlled with valve 424. A second stream 414b from the vessel 416 recycles any dissolved solvent in condensed steam 414 back to the stream stripper 412.

Extraction Processing and Equipment: The desired extraction process for algae oil recovery must satisfy certain requirements and avoid potential deficiencies for economic recovery. There are several "wet" extraction processes for oil recovery that are technically feasible but are not necessarily economical. Minimal oil recovery costs are critical if the ultimate use of the recovered algae oil is fuel.

The optimum oil extraction process should include: (i) processing a bio-cellular aqueous slurry containing oil, (ii) using a non-polar solvent or extracted oil with extremely low miscibility in water, (iii) using a solvent (if necessary), that easily separates from the oil, (iv) using extraction equipment that can handle high processing feed rates and easily scaled-up, (v) using extraction equipment that minimizes the entrainment of solvent into the biomass, (vi) using extraction equipment that provides a high contact area for mass transfer and non-polar lipid coalescence, (vii) using extraction equipment capable of handling concentrated algae feeds and not be irreversibly fouled by algae solids, (viii) using extraction equipment that is relatively compact and potentially portable to allow transport to different algae production sites, and (ix) using extraction equipment that is readily available, inexpensive and safe.

Membrane based processes for separations have been in existence for a long time. There are many types of membranes. Most membrane processes however use porous membranes wherein the membrane material performs a separation as a result of differences in diffusion and equilibrium between chemical components and on the molecular level. The present inventors however utilize a microporous membrane, which is used commercially in applications involving the transfer of gases to or from a liquid such as water. The microporous membranes function very differently from the porous membrane because of their relatively large pores. The microporous membranes do not truly separate chemical components on the molecular level like porous membranes do. The present invention relies on the coalescence of non-polar lipids present within the algae slurry to coalesce onto the hydrophobic surfaces provided by the hollow fibers. The vast surface area of the membrane, combined with the hydrophobic recovery fluid's ability to wet the membrane, creates a surface capable of coalescing small lipid droplets. Once coalesced into the recovery fluid, the lipids are transported out of the membrane through the inner tubes of the hollow fibers.

Membrane based Oil Recovery Process: For example, the application of a microporous hollow fiber (MHF) membrane contactor as the optimal separation equipment appears ideally suited for the recovery of algae oil. The MHF contactor provides all of the optimum characteristics listed previously. The application MHF contactor to algae oil recovery is novel, minimizes solvent loss, eliminates need for the steam stripper, minimizes solids contamination, and is easy to operate. The process does not involve dispersing a solvent into the algae biomass. The non-dispersive nature of the contactor is attractive in minimizing solvent loss and thus potentially eliminating the need for a steam stripper. A recovery fluid typically comprising of either a solvent (such as hexane) or a hydrophobic liquid, or algal oil is circulated through the hollow fibers for the recovery of the algal oils. The application of the MHF contactor in conjunction with a recovery fluid circulated through the microporous hollow fibers eliminates the need for a solvent and distillation column. The two oil extraction processing schemes with solvent and the recovery fluid are shown in FIGS. 5 and 6, respectively.

Figure 5:
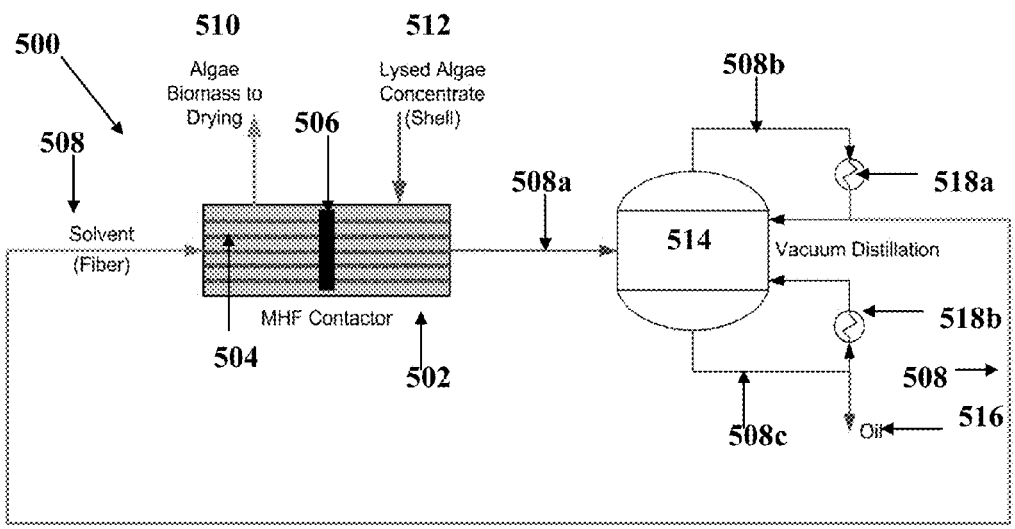
FIG. 5 is a flow diagram of the novel algal oil recovery process (with solvent) of the present invention.

FIG. 5 is a schematic 500 depicting the novel algal oil recovery process (with solvent) of the present invention. The process comprises a MHF contactor 502 comprising a plurality of microporous hollow fiber membranes 504 and a central baffle 506. Solvent 508 is fed (pumped) through the membrane fibers 504 and is contacted with the lysed algal concentrate 512 contained in the shell portion of the MHF contactor 502. There are two exit streams from the contactor 502, an algal biomass stream 510 which is processed further (dried) and a solvent stream 508a which contains the recovered algal oils and lipids 516. The stream 508a is passed through a vacuum distillation unit 514 to separate the oil 516 from the solvent 508 and to recover the solvent 508 for recycle and reuse. Exit stream 508b from the distillation unit 514 comprises pure solvent 508 which is recycled and fed to the contactor 502 to repeat the process and solvent requiring further separation and is recycled back to the distillation unit 514. Exit stream 508c from the distillation unit 514 comprises the algal oils 516. A portion of this stream is vaporized (518b) and returned to the distillation unit 514.

Figure 6:
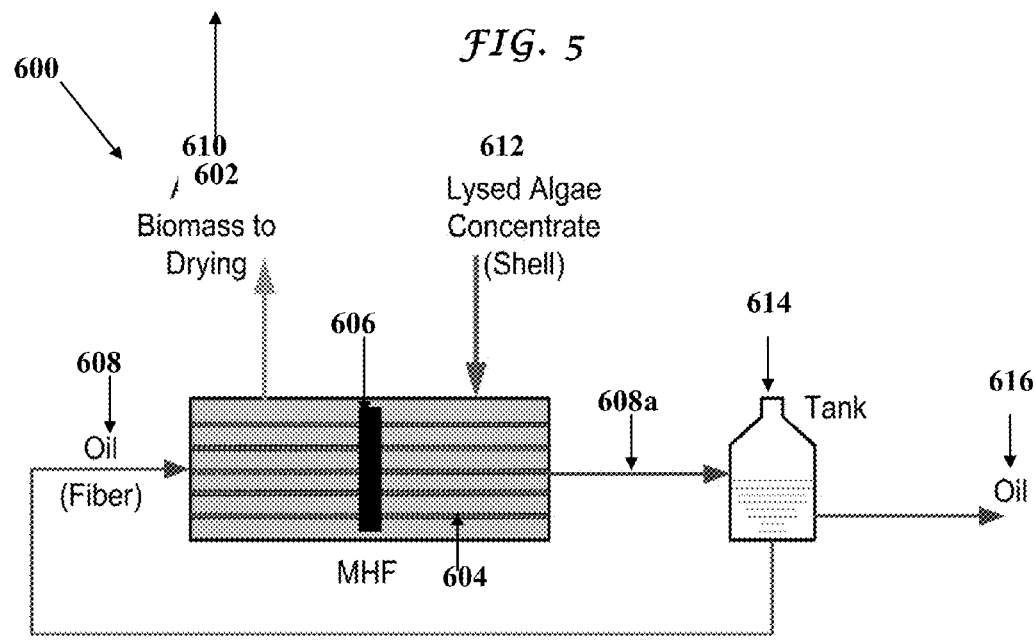
FIG. 6 is a flow diagram of the novel algal oil recovery process (without solvent) of the present invention.

FIG. 6 is a schematic 600 depicting the novel algal oil recovery process of the present invention. The process comprises a MHF contactor 602 comprising a plurality of microporous hollow fiber membranes 604 and a central baffle 606. Non-polar algae oil 608 is fed (pumped) through the membrane fibers 604 and is contacted with the lysed algal concentrate 612 contained in the shell portion of the MHF contactor 602. The non-polar algae oil functions to dissolved and sweep the coalesced oil from the algae concentrate. The non-polar oil 616 coalesces onto the hydrophobic fiber surface 604 and dissolves into oil contained in the walls and the counterflowing oil phase 608 and can be removed. There are two exit streams from the contactor 602, an algal biomass stream 610 which is processed further (dried) a stream 608a which contains the algal oils and lipids 616 that is collected in a tank 614. Part of the oil 616 can be removed from the tank 614 and fed to the contactor 602 to repeat the process.

Microporous hollow fiber contactors were initially developed in the 1980s. These early studies focused on lab-scale prototype modules containing just a few fibers. These early studies promoted the possibility of liquid-liquid extraction applications. The contacting of two immiscible liquids such as water and a non-polar solvent is unique with MHF contactors in that there is no dispersion of one liquid into another. This technology is sometimes referred to as non-dispersive extraction. The hollow fibers are generally composed of a hydrophobic material such as polyethylene or polypropylene. These hollow fibers could be made of a different material but it should be hydrophobic to avoid fouling of the fiber surface with the algae solids which are usually hydrophilic. The solvent should be a hydrocarbon with a very low solubility in water and is pumped through the hollow fibers. As a result of the hydrophobicity of the fiber material, the solvent will wet the microporous fibers and fill the micropores. The aqueous-based fluid is pumped through the shell-side of the membrane contactor. To prevent breakthrough of the solvent into the shell-side, the shell or aqueous side is controlled at a higher pressure than the fiber or hydrocarbon side. This results in immobilizing a liquid-liquid interface in the porous walls of the hollow fibers. Unfortunately when these modules were scaled-up for liquid-liquid extraction, the performance was usually disappointingly poor. Further studies identified the poor efficiency was a result of shell-side bypassing. An improved version (referred to as the Liqui-Cel Extra Flow contactor) was developed which eliminated the possibility of shell-side bypassing by incorporating a shell-side distributor. While the design eliminated the shell-side bypassing, the new design eliminated true counter-current contacting. The overall performance was improved somewhat relative to the original design. Nevertheless, the new design did not correct the fundamental limitations of pore-side mass transfer resistance that would control most commercially significant extraction applications. As a result, only a few commercial liquid extraction applications using MHF contacting technology exist today.

Also, the MHF contactors often required expensive filter systems to avoid plugging with solids associated with most commercial liquid-liquid extraction processes. The Liqui-Cel contactor used in the present invention has been applied almost exclusively to commercial processes that transfer a gas to or from a liquid such as oxygen stripping from water for the microelectronics industry.

No applications of the MHF contactors are known for enhancing coalescence and removing of oil drops from water. Certainly no applications of MHF technology are known for oil recovery from water involving a significant solids concentration.

Figure 7:
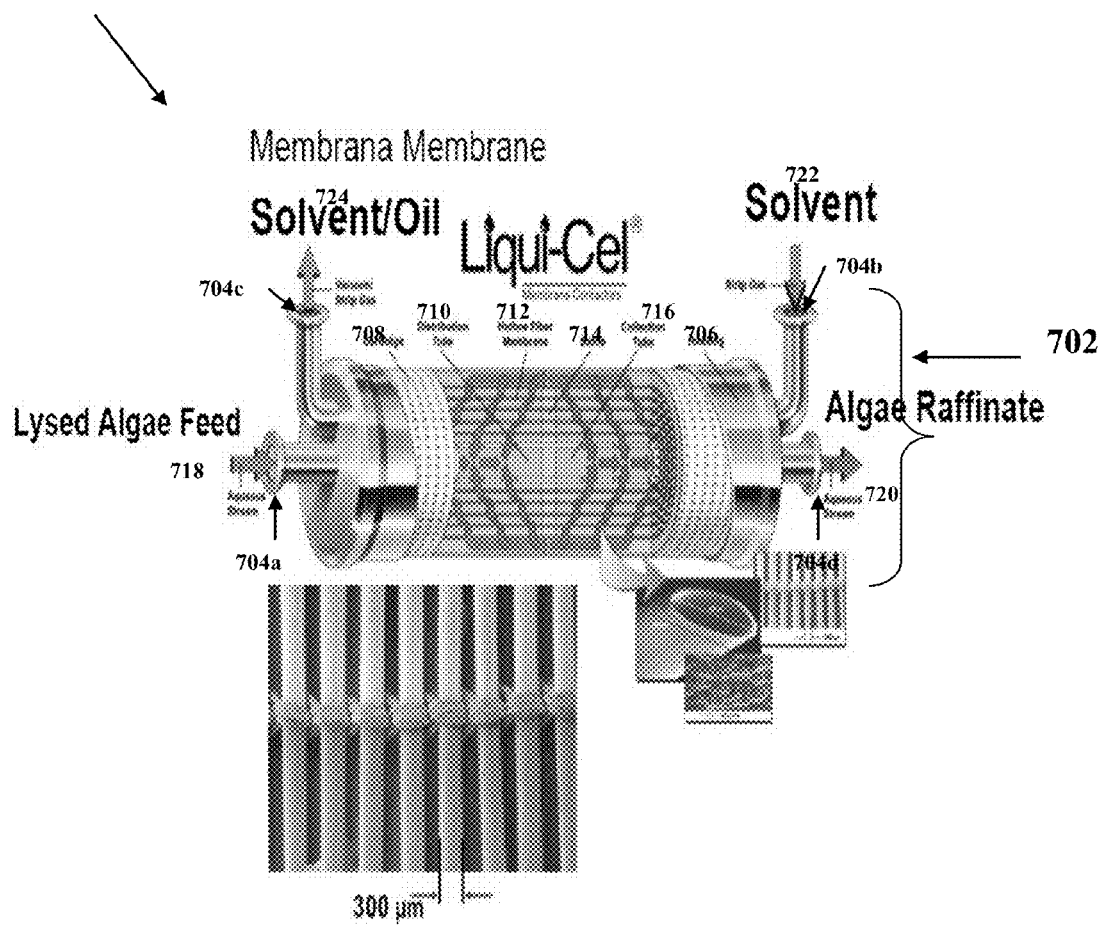
FIG. 7 is a schematic of the Liqui-Cel extra flow microporous hollow fiber membrane contactor.

FIG. 7 is a schematic 700 of the Liqui-Cel extra flow microporous hollow fiber membrane contactor 702. The contactor 702 comprises a metallic or polypropylene housing 706, wherein is contained a cartridge 708 comprising a plurality of hydrophobic microporous hollow fibers 712, along with a distribution tube 710, a collection tube 716, and a central baffle 714. The housing 706 has 2 inlet ports (704a and 704b) and two outlet ports 704c and 704d.

As shown in FIG. 7, the aqueous phase 718 is fed through the port 704a on the shell-side while the solvent (or oil) phase 722 is fed on the fiber side through port 704b. The non-polar lipids coalesce onto the hydrophobic surface and wet and dissolve into walls and into the counterflowing solvent (or oil) phase. A higher pressure is maintained on the aqueous side to prevent bleed through of the solvent (or oil) phase. However the shell-side pressure is kept below the breakthrough pressure which forces aqueous phase 718 into the solvent (or oil) phase 722. The algae concentrate 718 and solvent feeds 722 could be operated at room temperature or preheated up to 60° C. The solvent (or oil) phase along with the recovered lipids or oils is removed through outlet port 704c, and the aqueous algal raffinate containing the algal biomass and other solids is removed through the port 704d.

While not intuitive because of the presence of algae solids, the MHF contactor appears ideal for recovering oil from lysed algae. The MHF contactor provides: (i) high contact area for coalescence and mass transfer, (ii) processing of un-flocculated or deflocculated algae solids, (iii) large flow capacities on the shell side, (iv) negligible mass transfer resistance in the pore because of the high equilibrium distribution coefficient of non-polar oils into non-polar solvent, and (v) low cost per unit of algae flow per unit as the contact area is 100× that for the conventional liquid extraction contactor (e.g. perforated plate column).

The MHF contactor provides four significant advantages: (i) no density difference is required, (ii) no entrainment of solvent which may eliminate the need for a stripping column when the proper solvent is selected, (iii) easy control of the liquid-liquid interface by controlling the pressures, (iv) extremely large area for coalescence of small algae oil drops. The MHF contactor functions primarily as an oil coalescer. The solvent acts to simply remove the coalesced oils from the surface of the fibers, and (v) while not optimized, commercial MHF contactor modules used for gas transfer are available and reasonably priced. The Liqui-Cel Extra Flow contactor is a good example.

MHF Contactor Performance Data: The present inventors characterize the performance of the MHF contactor for algal oil recovery. The objectives of the studies were to determine the fraction of non-polar algae recovered from the feed and determine if membrane plugging was observed. The 4-inch diameter Liqui-Cel Extra Flow Contactor, purchased from Membrana [Part#G503], was used to recover algae oil from an actual lysed algal concentrate (FIG. 7). Typical oil recoveries from experimentally lysed algae ranged from 45→80% for a single module. The results of the studies are shown in Table 1. Differences in oil recoveries may be attributed to the lysing efficiency, polarity of the algae oil, differences in oil wettability and coalescence onto the membrane fibers. Membrane plugging is not observed when processing lysed algae concentrates where the algae is not flocculated or has been deflocculated. A typical range of conditions associated with the recovery of non-polar algae oil is shown in Table 1. These data are based on the processing of actual lysed algae. Since the non-polar oil recovery efficiency is also affected by the lysing efficiency, controlled experiments were carried out where known quantities of canola oil were injected into a re-circulating algae concentrate stream. In the first set of studies, heptane was re-circulated on the tube side as a non-polar oil specific recovery fluid. The results of these studies are shown in Table 2. In the initial small scale studies, 44-64% of the injected oil volume was recovered by the microporous hollow fiber membrane when only 25 mLs of canola oil was injected. When a larger quantity of canola oil was injected (250 mL), more than 90% of the injected oil volume was recovered as shown in Table 2. These data provide evidence that a fixed volume of oil is likely held up in the walls of the hollow fibers. In a second set of studies using canola oil injected into lysed algae concentrate, canola oil was re-circulated through the hollow fiber tubes as a recovery fluid instead of heptane. As shown in Table 3, 93% of the 9 liters of injected canola oil was recovered, conclusively demonstrating that a "like" oil can be used as a recovery fluid. The second set of studies validates the mechanism that the process is based on coalescing and recovery of the oil drops from the aqueous slurry can be done using a "like" oil. The canola oil runs also provide supporting data for the application of the non-dispersive microporous hollow fiber technology in removing residual oil from produced water, as canola oil/water emulsions are an accepted experimental proxy to mimic produced water in a laboratory setting. The results from Tables 2 and 3 indicate that oil recoveries approaching 100% are possible. The walls of the hollow fibers will always contain oil during processing.

TABLE 1

Typical algal oil recoveries from lysed algae with the MHF Contactor.

| Parameter | Overall Range | Typical Range |
|---|---|---|
| Algae concentration, wt % | 0.01-15 | 1-5 |
| Non-polar Oil in Algae, wt % | 0.5-10 | 2-6 |
| Algae Flow rate, gpm | 0.5-2 | 0.5-1 |
| Heptane Flow rate, gpm | 0.04-0.07 | 0.07 |
| Non-polar Oil Recovery, % | 40-90 | 70-80 |

TABLE 2

Results of controlled study using Heptane flowing through the tubes. Basis: Algae feed rate = 1,000 lbs/hr, Heptane feed rate = 50 lbs/hr, Total mass of re-circulating algae = 50 lbs containing approximately 1.5 wt % bio-cellular solids, Oil injection rate = 0.17 lbs/hr.

| Test | #1 | #2 | #3 | #4 |
|---|---|---|---|---|
| Oil Injected, ml | 25 | 25 | 210 | 210 |
| Oil Recovered, ml | 11 | 16 | 198 | 188 |
| Missing Oil | 114 | 99 | 12 | 22 |
| % Oil recovery | 44 | 66 | 94 | 90 |

TABLE 3

Results of the solventless test with Canola oil flowing through the tubes. Shell-side and tube-side flows are re-circulated.

| Tube-Side | Canola Oil |
|---|---|
| Shell-Side | 50 lbs of Algae Concentrate |
| wt % bio-cellular solids in algae | Approximately 1.5 wt % |
| Tube Side Flow rate | 10-15 lbs/hr |
| Shell Side Flow rate | 500, lbs/hr |
| Canola Oil Injection Rate into Algae | 3 ml/min |

TABLE 3-continued

Results of the solventless test with Canola oil flowing through the tubes.
Shell-side and tube-side flows are re-circulated.

| Run Time | 72 hours |
|---|---|
| % Recovery of Injected Canola Oil | 93% |

It should be noted that the algae concentrate feed or bio-cellular feed must not contain flocculated algae or solids to prevent plugging within the membrane module. For the case of the MHF contactor described in the present invention, the minimum dimension for shell-side flow is 39 microns which is greater than the size of most single alga. It is likely that flocculated algae will eventually plug the shell-side of the MHF contactor.

In a related and alternative process, the microporous membrane could be used to separate two liquids from a solid-liquid-liquid emulsion. The solid-liquid-liquid emulsion may have been derived from a process for recovering oil from a bio-cellular aqueous feed using a dispersive process. The microporous membrane hollow fiber contactor would allow the hydrocarbon liquid to "wet" and coalesce into the walls of the hollow fibers while preventing the hydrophilic solids or aqueous phase from entering. Thus the hydrocarbon liquid will exit the membrane on the tube side when an appropriate recovery fluid is employed, while the aqueous liquid and solids will exit on the shell-side. An alternative process is shown in FIG. 9.

Figure 9:
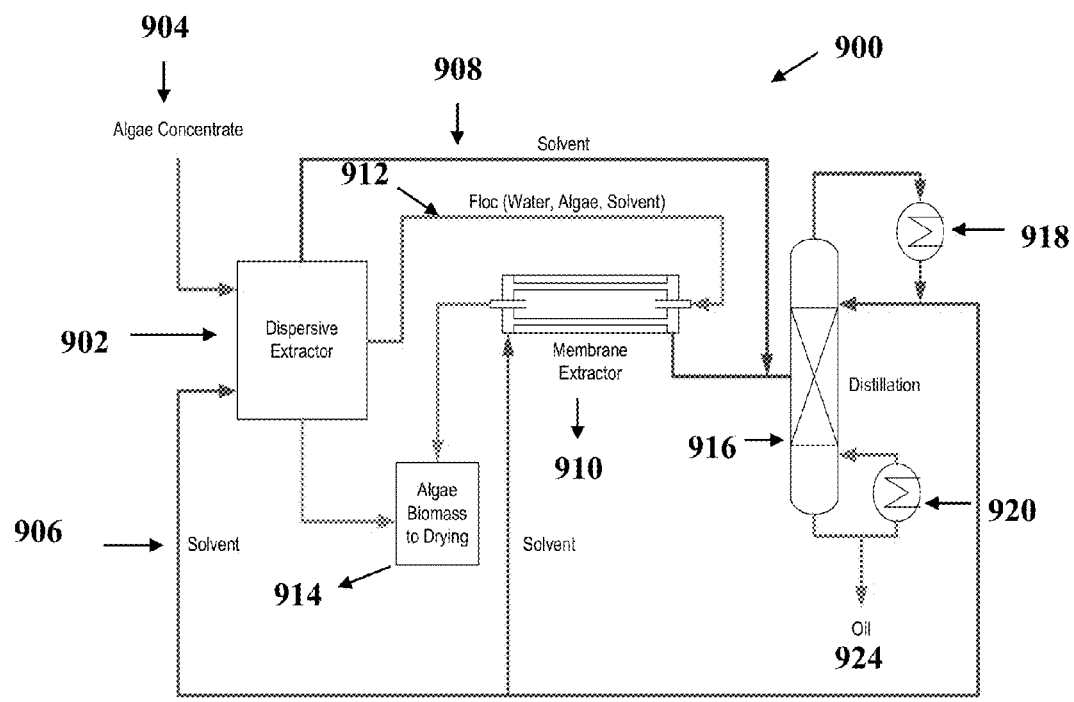
FIG. 9 shows an alternative process where a solid-liquid-liquid emulsion potentially derived from a dispersive extraction is fed to the shell-side of the microporous hollow fiber membrane for the purpose of separating the two liquids.

The flow diagram 900 shown in FIG. 9 of the alternative algae oil extraction process comprises a dispersive extraction column 902, lysed algal concentrate 904 and solvent 908 is fed to a dispersive extractor such as a column extractor, centrifugal type extractor or mixer-settler 902. The solid-liquid-liquid emulsion (S-L-L) 912 from the column 902 comprising algae-water-solvent is then fed to a shell-side of a microporous membrane extractor (contactor) 910. Any solids (algal biomass) from the column extractor 902 may be directly subjected to further processing (e.g. drying) as shown by step 914. The microporous membrane hollow fiber contactor 910 allows the hydrocarbon liquid to "wet" and coalesce into the walls of the hollow fibers while preventing the hydrophilic solids or aqueous phase from entering. The hydrocarbon liquid exits the membrane contactor 910 on the tube side when an appropriate recovery fluid (for e.g. solvent 908) is employed on the tube side, while the aqueous liquid and solids (algal biomass) will exit on the shell-side for further processing (e.g. drying) as shown by step 914. The hydrocarbon liquid is then fed to a distillation unit 916 (heat exchangers associated with the distillation unit are shown as 918 and 920) for removal of any residual solvent 906 and to recover the algal oil 924. The recovered solvent 906 may be circulated back into the process, for e.g. as the recovery fluid on the tube-side of the membrane contactor 910 or back to the dispersive extraction column 902.

The recovery fluid on the tube side can be tailored to enhance recovery or selectively recover sub-sets of desired compounds, and leave others. Study data demonstrates that hydrocarbons and non-polar lipids are removed using heptane or like oil and phospholipids are not.

Figure 8:
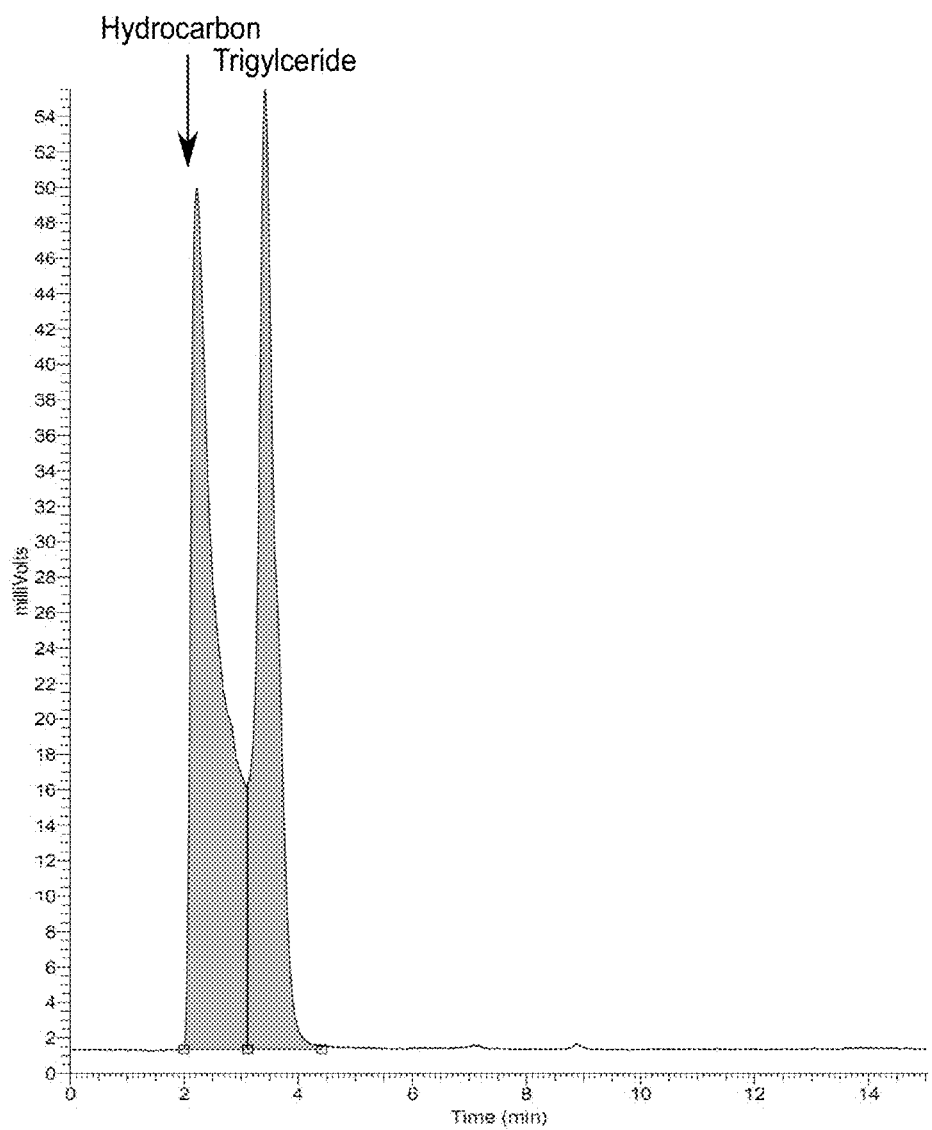
FIG. 8 is a HPLC trace (chromatogram) of oil obtained using hollow fiber membrane recovery of oil from a lysed suspension of Nanochloropsis. Two main peaks are seen in this sample, the first is a mixture of various long chain hydrocarbons and the second is a triglyceride.

To determine the composition of the recovered oil, the inventors performed a normal phase HPLC using a Sedex 75 evaporative light scattering detector. As shown in FIG. 8, two main components were detected in this particular sample of oil, the first peak corresponding to long chain hydrocarbons and the second corresponding to triglycerides. In some samples, 1,3 and 1,2 diglyceride have also been detected.

Figure 10:
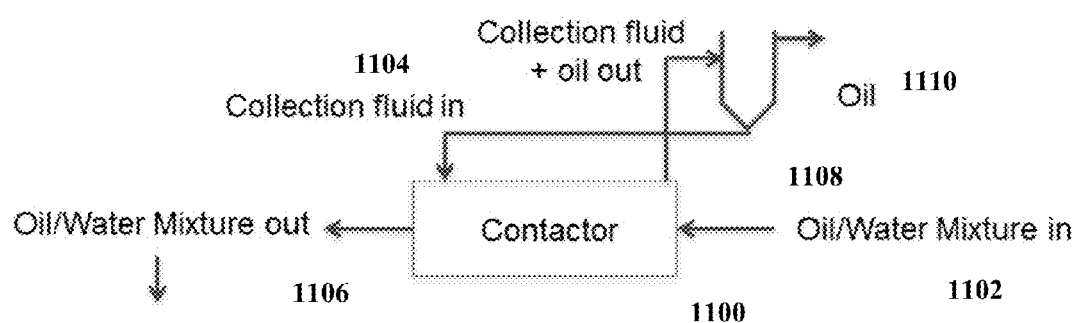
FIG. 10 is a schematic showing the method and the oil/water separation principle for recovery/removal of oil from an oil/water mixture as described in the embodiments of the present invention.

FIG. 10 is a schematic showing the method and the oil/water separation principle for recovery/removal of oil from an oil/water mixture as described in the embodiments of the present invention. In this mode of operation the present invention can be used for most oil/water mixtures that are up to ~90% oil by volume. The oil-water mixture emanating from the shell side may be further processed, for example with an additional contactor. In this embodiment, an oil/water mixture 1102 enters the membrane contactor 1100 and the oil coalesces on a first surface of the membrane contactor 1100. A recovery fluid 1104 that is in contact with a second surface of the membrane contactor 1100 collects coalesced oil 1108. An oil/water mixture without the coalesced oil 1106 and recovered exits the membrane contactor 1100 and can be further processed by contacting with the same or a different membrane contactor (not shown).

Figure 11:
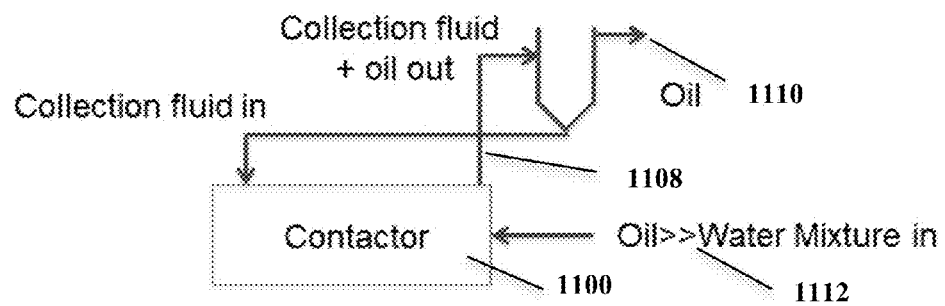
FIG. 11 is a schematic showing the method and the oil/water separation principle for exclusion of water from a water/oil mixture.

FIG. 11 is a schematic showing the method and the oil/water separation principle for exclusion of water from a water/oil mixture. In this mode of operation the present invention is appropriate for very low water content streams. With the shell side outflow capped, the excluded water will accumulate in the shell side of the module. The tube side oil outflow rate can be used to indirectly monitor the accumulation of water in the shell side. As water accumulates, the effective shell side surface area begins to decrease, leading to reduced tube side flows. Briefly opening the shell side outflow valve can purge the accumulated water and return the unit to high efficiency operation. In this embodiment, an oil>>water mixture 1112 enters the membrane contactor 1100 in which the oil is the primary portion of the liquid and the water or other non-oil liquid is a lesser part of the mixture, and the oil coalesces on a first surface of the membrane contactor 1100. A recovery fluid 1104 that is in contact with a second surface of the membrane contactor 1100 collects coalesced oil 1108. An oil/water mixture without the coalesced oil 1106 exits the membrane contactor 1100 and can be further processed by contacting with the same or a different membrane contactor (not shown). In one embodiment, the amount of oil to water/non-oil liquid, volume to volume, may be 50:50, 60:40, 70:30, 80:20, 90:10, 91:9, 92:8, 93:7, 94:6, 95:5, 96:4, 97:3, 98:2, 99:1, 99.5:0.5, 99.6:0.4, 99.7:0.3, 99.8:0.2, and 99.9:0.1.

Figure 12:
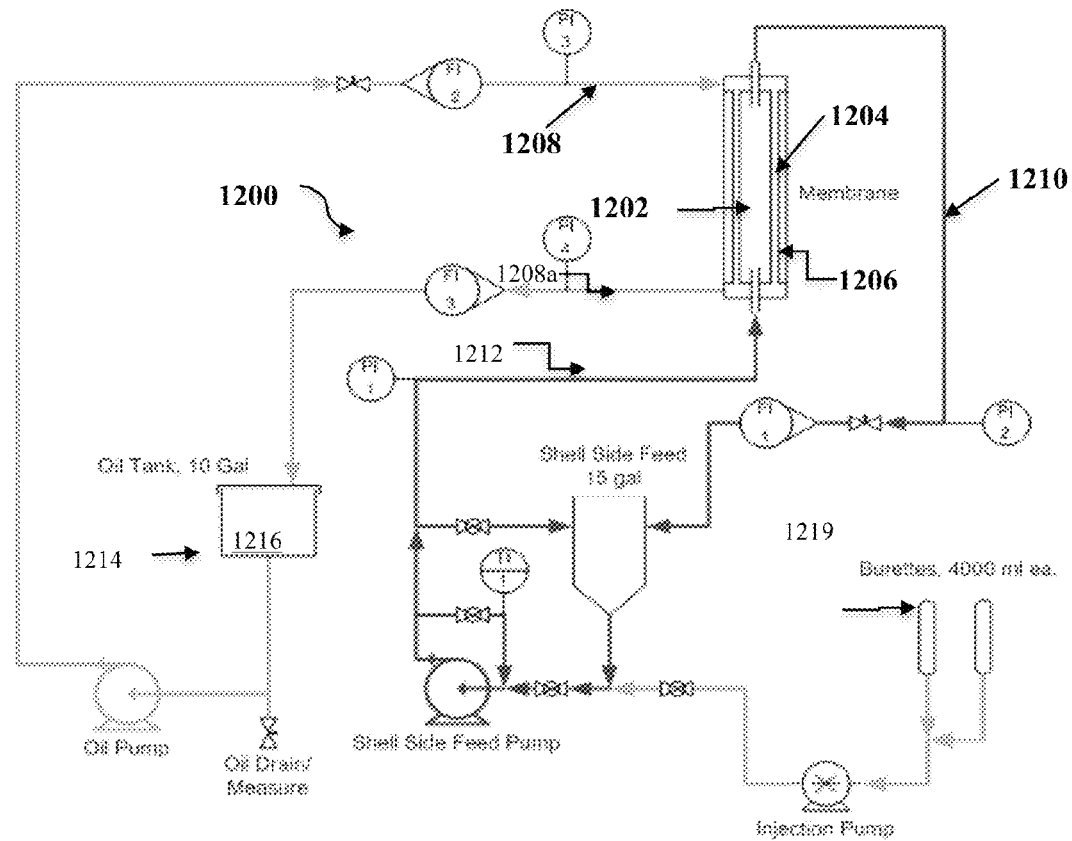
FIG. 12 is a flow diagram of the equipment used to create oil water mixtures and separate it.

FIG. 12 is a flow diagram of a membrane contactor system 1200. In this embodiment, the membrane contactor 1202 is a schematic 1200 depicting a novel oil recovery process of the present invention. The process comprises a MHF contactor 1202 comprising a plurality of microporous hollow fiber membranes 1204 and a central baffle 1206. In one non-limiting example of an oil, non-polar Algae oil 1208 is fed (pumped) through the membrane fibers 1204 and is contacted with the lysed yeast or algal oil concentrate 1212 contained in the shell portion of the MHF contactor 1202. The non-polar oil 1216 coalesces onto the hydrophobic fiber surface 1204 and dissolves into oil contained in the walls and the counterflowing oil phase 1208 and can be removed. There are two exit streams from the contactor 1202, a yeast or algal biomass stream 1210 which is processed further (dried) a stream 1208a which contains the yeast or algal oils and lipids 1216 that is collected in a tank 1214. Part of the oil 1216 can be removed from the tank 1214 and fed to the contactor 1202 to repeat the process. Media, nutrients, additional organisms (yeast or algae), liquid or other compositions can be provided from burettes 1219. Multiple pumps and valves may be used to control the flow of the various liquids and components.

Figure 13:
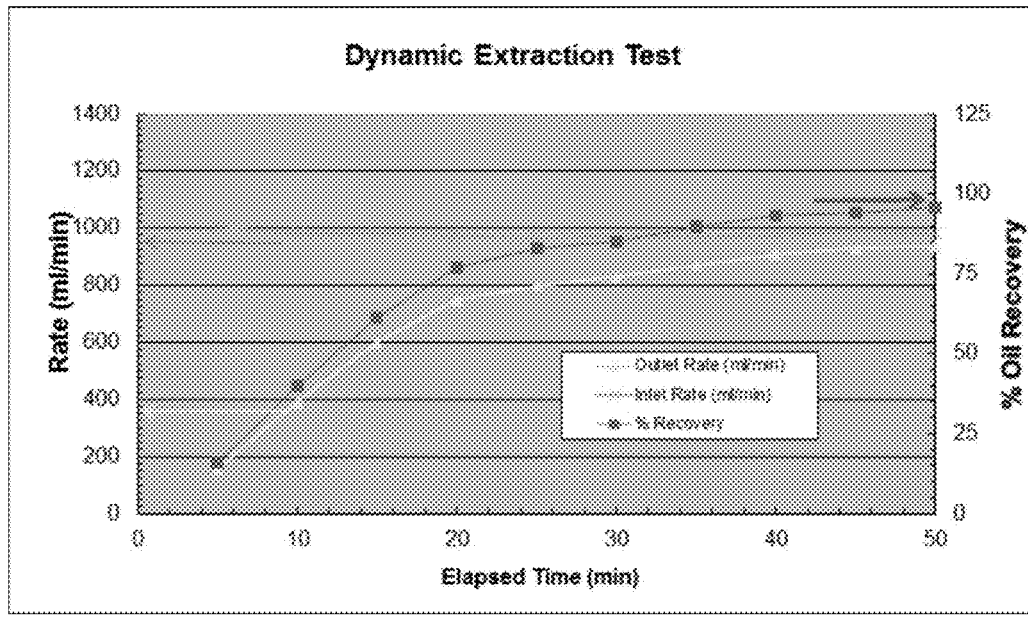
FIG. 13 is an example of oil/water separation from a ~12% oil in water mixture without a recovery fluid.

FIG. 13 is a graph that shows the test results from the recovery of oil from a mixture created to test for oil recovery in the absence of recovery fluid at constant pressure. Briefly, 980 mL of oil (isopar L) was injected per minute into a stream of water flowing at 2 gpm. Oil volume was recovered directly from the tube side outflow and the volume of oil recovered was measured at 5 min intervals.

Figure 14:
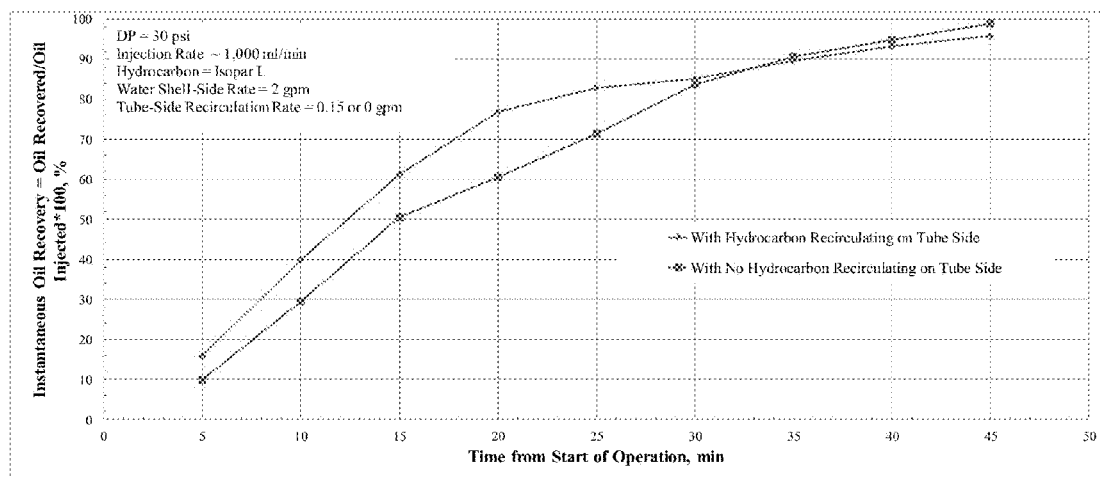
FIG. 14 is a comparison of oil/water separation with and without a recovery fluid.

FIG. 14 is an example of oil/water separation from a ~12% oil in water mixture with and without a recovery fluid at constant pressure. 1000 mL of oil was injected into a water stream flowing at 2 gpm. Volumes of oil recovered were determined using a calibrated sight glass when recovery fluid was used, and by direct measurement of volume recovered from the tube side outflow when recovery fluid was not used. With recovery fluid, the instantaneous recovery is higher in the first minutes of operation.

Figure 15:
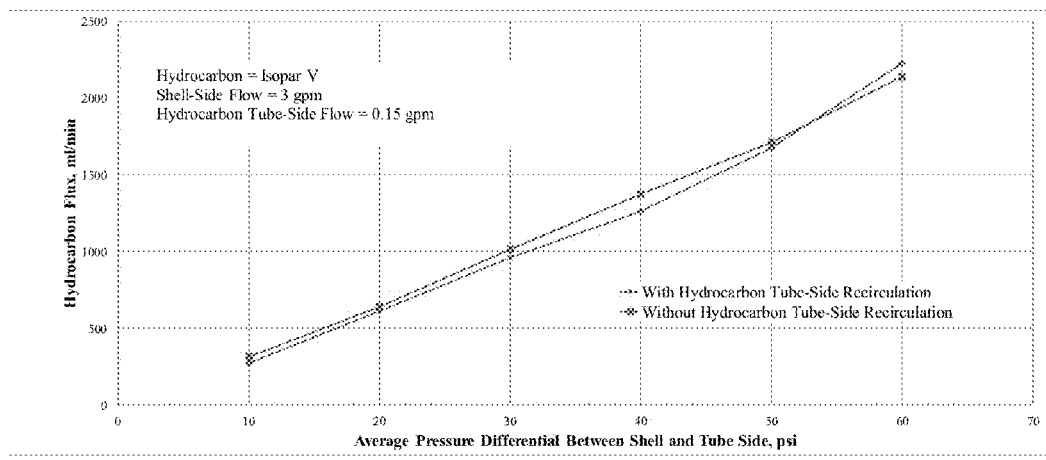
FIG. 15 is an example of oil flux through the tubes of the membrane with and without a recovery fluid.

FIG. 15 is a comparison of pure oil flux rates with and without a recovery fluid. In this study, the test ran at 3 gpm of oil (isopar V) on the shell side with the shell side outlet open. Volumes of oil recovered were determined using a calibrated sight glass when recovery fluid was used, and by direct measurement of volume recovered from the tube side outflow when recovery fluid was not used. This experiment also shows the approximately linear relationship between pressure and flux, in which the flux rate increases with increasing pressure.

Figure 16:
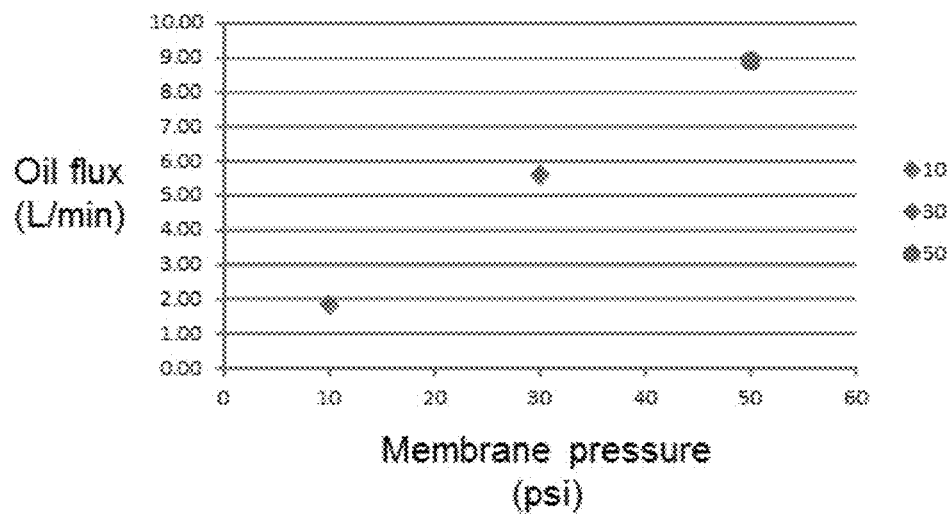
FIG. 16 is an example of the relationship between pressure and flux rate for oil.

FIG. 16 is an example of oil flux with and without a recovery fluid. This test demonstrates the flux of pure oil (isopar L) as a function of pressure in the absence of a recovery fluid. For the 10 and 30 psi points, isopar L was circulated at ~3 gpm on the shell side of the membrane. Oil volume was recovered directly from the tube side outflow. The test proceeded until 4 L of oil was recovered from the tube side. For the 50 psi dataset, the shell side outflow was capped, forcing the oil to pass through to the tube side. The test proceeded until 4 L of oil was recovered from the tube side. The average flux rate of duplicate runs is shown.

When considered with the previous figure, this test shows that the viscosity of the oil is a variable in the flux rate. For example, isopar L fluxed at a rate of about 5.5 L per min through the membrane at 30 psi. By contrast, the flux rate of isopar V at 30 psi was about 1 L per min in the previous test. The difference in flux rates is directly related to the viscosity of the oils; isopar V (~17 cSt) is significantly more viscous than isopar L (~2 cSt) and fluxes more slowly at identical operating conditions.

Figure 17:
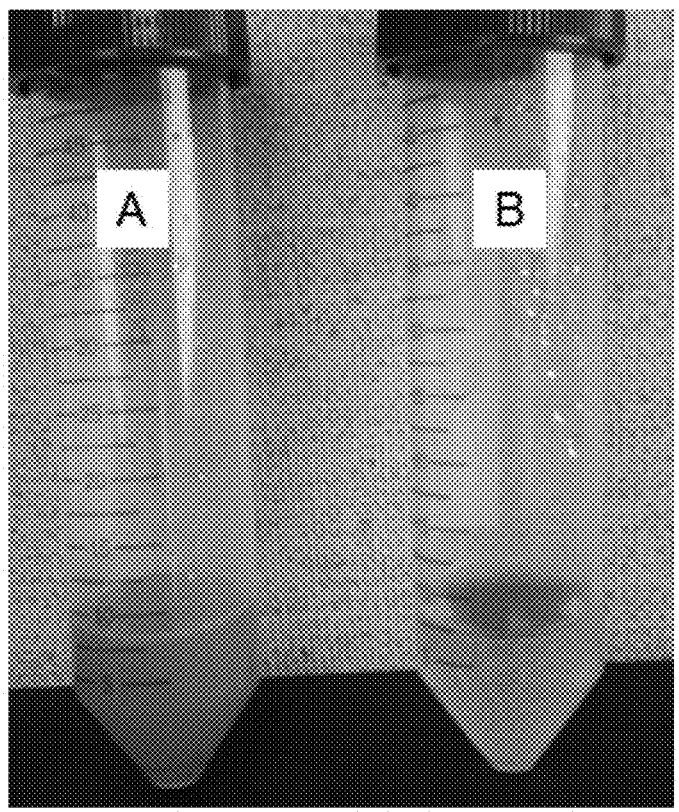
FIG. 17 is an example of oil removal from oilfield waste water without a recovery fluid.

FIG. 17 is an example of oil recovery from wastewater. Approximately 5 gallons of oil field wastewater containing light oils and solids of unknown composition was passed through the contactor to remove the oil. A recovery fluid was not used. The material was circulated through a 2.5 inch diameter membrane approximately 10 times with a 30 psi pressure differential. At the conclusion of the test, the shell side effluent (A) still contained the solids. A quantity of oil was recovered from the tube side (B).

Figure 18A:
FIGS. 18A and 18B are examples of water exclusion from oil.
Figure 18B:
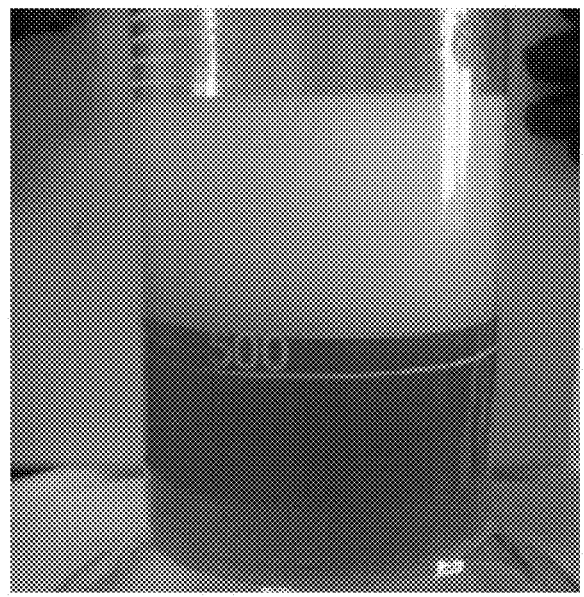

FIGS. 18A and 18B are examples of water exclusion from oil without a recovery fluid. Approximately 19 liters of isopar L was mixed with 1 liter of water and circulated repeatedly through a pump to create an emulsion (FIG. 18A, on left). This mixture was passed through a 4 inch diameter membrane to exclude the water. The shell side inlet pressure was 25 psi and a recovery fluid was not used. Oil volume was recovered directly from the tube side outflow. The test was stopped once 14 L isopar L was collected from the tube side outflow (FIG. 18A, on right). Alternately, the water exclusion process can be run with the shell side outflow capped; in this case, excluded water accumulates in the shell side of the membrane. FIG. 18B shows a sample of the remaining volume from the shell side of the membrane from a similar demonstration; water is on the bottom and remaining water/oil emulsion is on the top.

Figure 19:
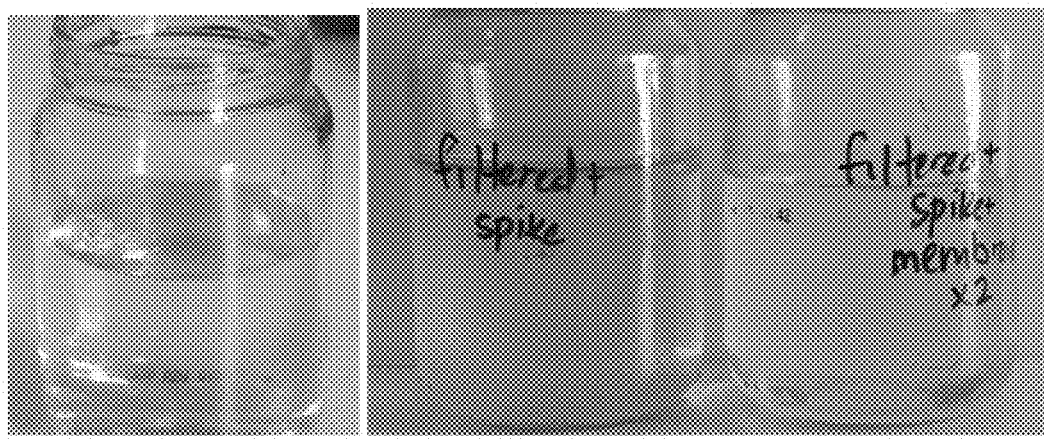
FIG. 19 shows Produced water with 10-15 mg/L iron content was filtered on a 12 uM glass filter to remove insoluble iron (A, left); water treated with the membrane develops new insoluble iron more slowly (A, center), as the oxygen content of the water is lowered by treatment with the membrane (A, right).

FIG. 19 shows produced water with 10-15 mg/L iron content was filtered on a 12 uM glass filter to remove insoluble iron (FIG. 19, left). Following filtration, crude oil was spiked into the filtered water at a concentration of approximately 100 ppm. A sample of the filtered water with spiked oil was collected and set aside. The remaining produced water with spiked oil was passed through the membrane three times to remove the oil. Approximately 3 hours after the oil was introduced into the filtered water, the samples of the starting material and the water treated with the membrane were compared. The formation of insoluble iron in the water is driven by the presence of oxygen in the water. The untreated, filtered water steadily develops new insoluble iron over time. The water treated with the membrane develops new insoluble iron more slowly (FIG. 19, center), as the oxygen content of the water is lowered by treatment with the membrane (FIG. 19, right). Oil-in-water analyses were conducted on samples of the filtered water, filtered water with oil spiked and the membrane-treated water. Passing the water with spiked oil through the membrane twice reduced the oil concentration to less than 3 ppm and increased the pH from 7 to 7.5. The increase in pH is consistent with the removal of $CO_2$ from the water. Table 4 summarizes the results of the removal of oil in water and the change in pH.

TABLE 4

Oil removal was quantified.

| Sample | OIW (ppm) | pH |
| --- | --- | --- |
| Filtered water | 5 | Not determined |
| +Oil, starting | 305 | 7 |
| +Oil, membrane first pass | 10 | Not determined |
| +Oil, membrane second pass | <3 ppm | 7.5 |

Figure 20A:
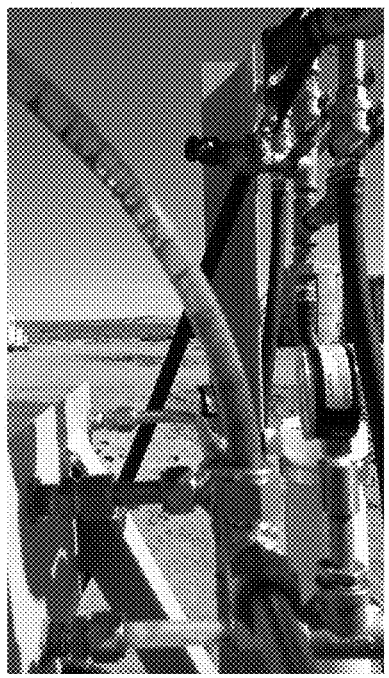
FIGS. 20A and 20B are images showing simultaneous oil and gas removal. Bubbles are evident in the tube side collection line (20A) and tube side flow meter (20B) during operation.
Figure 20B:
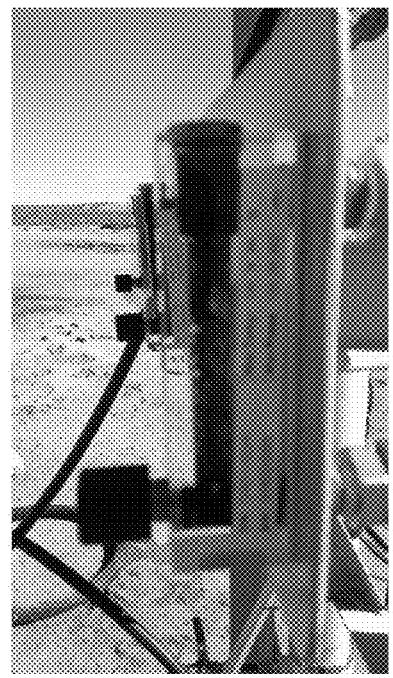

FIGS. 20A and 20B show the apparatus operating to remove oil from produced water at an oilfield site. As can be seem clearly in FIG. 20A, gas is removed from the stream during oil removal as demonstrated by the bubbles in the tubing. Bubbles continuously appear in the tube side collection volume with the collected oil, as seen in the tube side outflow line (20A) and at a flow meter (20B). The produced water stream was under pressure.

It will be understood by the skilled artisan that the process described hereinabove is applicable broadly for insoluble oil recovery beyond algae to include protists, fungi, yeast, *E. coli*, etc., mixed cultures of cells, grown by any method (not limited to photosynthetic organisms), aqueous slurries or aqueous mixtures containing broken and/or live cells or no cells (in case pre-treated to remove cells/cell debris or other suspended materials). The process can also be used to recover oil from any liquid source comprising insoluble oils for e.g. industrial water, brine, wastewater, industrial or natural effluents, water-oil mixtures, aqueous slurries, aqueous slurries comprising broken cells, live cells or combinations thereof, bio-cellular mixtures, lysed cellular preparations, and combinations thereof. The process of the present invention is capable of recovering almost up to a 100% of the one or more insoluble oils in the liquid source. The process provides insoluble oil recoveries of 45%, 50%, 55%, 60%, 65%, 70%, 75%, 80%, 85%, 90%, 95%, 98%, 99% and 100% from the liquid source.

The method and the process of the present invention can be expanded for recovery of a variety of molecules depending upon choice of recovery fluid and to include single or multi-step, differential recovery processes for e.g., specifically recover non-polar oil with one membrane module, then treat the effluent with a second membrane module employing a different recovery fluid. The recovery fluids may be selective, partially selective or non-selective for specific compounds. In other specific examples, the present invention may be used to specifically recover non-polar oil with one membrane module, then followed by treatment of the effluent from the first module with a second membrane module employing a different recovery fluid.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

U.S. Pat. No. 4,439,629: Extraction Process for Beta-Carotene.
U.S. Pat. No. 5,378,639: Solvent Extraction.

What is claimed is:

1. A method for separating oil and gas from a liquid, the method comprising the steps of:
   contacting a first surface of a membrane contactor with the liquid, wherein the liquid includes water containing insoluble oil droplets and one or more gases;
   coalescing the insoluble oil droplets in the liquid onto walls of one or more hydrophobic fibers of the membrane contactor;
   passing oil from the coalesced insoluble oil droplets from the first surface of the membrane contactor through the walls of the one or more hydrophobic fibers and to a second surface of the membrane contactor;
   passing gas from the water through the walls of the one or more hydrophobic fibers and to the second surface of the membrane contactor; and
   collecting the oil and gas from the second surface of the membrane contactor into a collection fluid in contact with the second surface of the membrane contactor, wherein the collection fluid is selected to allow the insoluble oil droplets to coalesce on the walls of the one or more hydrophobic fibers.

2. The method of claim 1, further comprising removing solids from an oil/water mixture to form the liquid, wherein removing the solids includes using a solid removal system, wherein the liquid contains only solids smaller than 30 microns, and wherein the solid removal system comprises at least one of a sand filter, a rock filter, a porous ceramic material, a centrifuge, a mesh, a particulate filter, a sieve, a strainer, or gravity.

3. The method of claim 2, wherein the contacting, coalescing, and collecting occur within 1, 2, 4, 6, 8, 12, 24, 26, 48 or 72 hours from removal solids from the liquid.

4. The method of claim 1, wherein the liquid comprises one or more of crude oil, transportation fuel, heating oil, refined petroleum products, petrochemicals, bio-oils, renewable oils, growth media, fermentation broth, vegetable oils, reclaimed oils, waste oils, oil industry liquid streams, oil contaminated water or brine, drilling mud, produced water and oil sands tailings.

5. The method of claim 1, wherein the liquid is at least one of: not subjected to gravity separation prior to processing, subjected to gravity separation prior to processing, or subjected to centrifugation prior to processing.

6. The method of claim 1, wherein the membrane contactor comprises one or more hollow fiber microporous membranes.

7. The method of claim 1, wherein the membrane contactor is a hydrophobic hollow fiber membrane comprising polyethylene, polypropylene, polyolefins, polyvinyl chloride (PVC), amorphous polyethylene terephthalate (PET), polyolefin copolymers, poly(etheretherketone) type polymers, surface modified polymers, mixtures or combinations thereof or a surface modified polymer that comprises polymers modified chemically at one or more halogen groups by corona discharge or by ion embedding techniques.

8. The method of claim 1, further comprising contacting the second surface of the membrane contactor with the collection fluid in a counterflowing fashion to collect the oil from the second surface of the membrane contactor, wherein the collection fluid comprises one or more of a hydrophobic liquid, a non-polar fluid, an alkane, hexane, an aromatic fluid, benzene, toluene, an ether, diethyl ether, a halogenated fluid, chloroform, dichloromethane, an ester, and ethyl acetate.

9. The method of claim 1, further comprising:
detecting a clog at the membrane contactor system using a clog detector; and
removing debris that clogs the membrane contactor using a membrane cleaning system.

10. The method of claim 1, further comprising:
separating the collected gas from the collected oil and the collection fluid; and
collecting the separated gas.

11. The method of claim 1, further comprising separating the collected gas from the collected oil and the collection fluid by reducing a pressure of the collection fluid, the collected oil and the collected gas in a vessel, tank or membrane.

12. The method of claim 1, wherein the collected gas comprises at least one of $O_2$, $CO_2$, $H_2S$, methane, ethane, propane, butane, pentane, or hexane.

13. The method of claim 1, wherein the collected oil and gas are separated from the liquid simultaneously.

14. The method of claim 1, wherein the collection fluid comprises collected oil previously passed through the walls of the hydrophobic fibers.

15. The method of claim 1, further comprising monitoring the liquid for a change in pH, ionic strength, oxidative state, electrical resistance, charge, or contamination to determine removal of gas and oil from the liquid.

16. The method of claim 1, wherein the method operates at 5 to 95 psi.

17. The method of claim 1, further comprising:
monitoring the liquid for a change in pH, ionic strength, oxidative state, electrical resistance, charge, or contamination of the oil-containing liquid; and
adding one or more ions, antibiotics, oxidizers, reducers, surfactants, detergents, chelators, hydrophilic liquids, hydrophobic liquid, acids, or bases to the liquid based on the change.

18. The method of claim 1, wherein the droplets comprise micron and submicron sized insoluble oil drops.

\* \* \* \* \*